(12) United States Patent
Kang et al.

(10) Patent No.: US 11,773,212 B2
(45) Date of Patent: Oct. 3, 2023

(54) PREPARATION METHOD OF POLYMER

(71) Applicants: LG CHEM, LTD., Seoul (KR); Regents of the University of Michigan, Ann Arbor, MI (US)

(72) Inventors: Joon Koo Kang, Daejeon (KR); Jinsang Kim, Ann Arbor, MI (US); Jeong Ae Yoon, Daejeon (KR); Sung Soo Yoon, Daejeon (KR); Jong Heon Kwak, Daejeon (KR)

(73) Assignees: LG ENERGY SOLUTION, LTD., Seoul (KR); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 505 days.

(21) Appl. No.: 16/807,653

(22) Filed: Mar. 3, 2020

(65) Prior Publication Data

US 2021/0284790 A1    Sep. 16, 2021

(51) Int. Cl.
*C08G 61/12* (2006.01)
*C09D 5/24* (2006.01)
(Continued)

(52) U.S. Cl.
CPC .............. *C08G 61/126* (2013.01); *C09D 5/24* (2013.01); *C09D 165/00* (2013.01); *H01B 1/127* (2013.01); *H01B 13/0036* (2013.01); *C08G 2261/12* (2013.01); *C08G 2261/3223* (2013.01); *C08G 2261/3247* (2013.01); *C08G 2261/40* (2013.01); *C08G 2261/90* (2013.01)

(58) Field of Classification Search
CPC .............. C08G 61/126; C08G 2261/12; C08G 2261/3223; C08G 2261/3247; C08G 2261/40; C08G 2261/90; C09D 5/24; C09D 165/00; H01B 1/127; H01B 13/0036

See application file for complete search history.

(56) References Cited

U.S. PATENT DOCUMENTS 6,632,472 B2   10/2003   Louwet et al.
8,318,046 B2   11/2012   Hsu et al.
(Continued)

FOREIGN PATENT DOCUMENTS

WO   2016/172081 A1   10/2016

OTHER PUBLICATIONS

Yin et al., ACS Appl. Mater. Interfaces 2013, 5, 8423-8429.*
(Continued)

*Primary Examiner* — Shane Fang
(74) *Attorney, Agent, or Firm* — BRYAN CAVE LEIGHTON PAISNER LLP

(57) ABSTRACT

The present application can provide a preparation method capable of preparing a desired polymer or conductive polymer film with excellent polymerization efficiency and conversion rates without consumption or modulation in the polymerization process, and a polymer and a conductive polymer film formed by the method. The present application can provide a method for preparing a polymer or a conductive polymer film having a desired level of transparency and conductivity, wherein desired physical properties such as solubility in a solvent or resistance to a solvent are effectively imparted thereto as necessary, and a polymer and a conductive polymer film formed by the method.

19 Claims, 17 Drawing Sheets

$^1$H-NMR (300MHz, CDCl$_3$): 6.42(s, 2H), 3.85 (s, 4H), 1.46-1.15 (m, 12H), 0.98-0.86 (t, 6H)

(51) Int. Cl.
C09D 165/00 (2006.01)
H01B 1/12 (2006.01)
H01B 13/00 (2006.01)

(56) References Cited

U.S. PATENT DOCUMENTS

| | | |
|---|---|---|
| 8,455,865 B2 | 6/2013 | Hsu |
| 8,597,547 B2 | 12/2013 | Grigorian et al. |
| 8,784,690 B2 | 7/2014 | Badre et al. |
| 8,908,252 B2 | 12/2014 | Sotzing et al. |
| 8,945,427 B2 | 2/2015 | Hsu |
| 8,987,720 B2 | 3/2015 | Suematsu et al. |
| 9,672,991 B2 | 6/2017 | Yan et al. |
| 2012/0018662 A1* | 1/2012 | Sugihara ............ H01G 9/028 252/62.2 |
| 2012/0312384 A1* | 12/2012 | Robinson ............ B01L 3/50273 137/13 |

OTHER PUBLICATIONS

Hiesang Sohn et al., "Novel Flexible Transparent Conductive Films with Enhanced Chemical and Electromechanical Sustainability: TiO2 Nanosheet—Ag Nanowire Hybrid", ACS Appl. Mater. Interfaces 2018, 10, 3, 2688-2700.

Michel De Keersmaecker, et al., "All Polymer Solution Processed Electrochromic Devices: A Future without Indium Tin Oxide?" ACS Applied Materials & Interfaces 2018 10 (37), 31568-31579.

Yijie Xia, et al., "Highly conductive poly(3,4-ethylenedioxythiophene):poly(styrene sulfonate) films treated with an amphiphilic fluoro compound as the transparent electrode of polymer solar cells", Energy Environ. Sci., 2012, 5, 5325-5332.

Wusheng Fan, et al., "Flexible films of poly(3,4-ethylenedioxythiophene)/carbon nanotube thermoelectric composites prepared by dynamic 3-phase interfacial electropolymerization and subsequent physical mixing", J. Mater. Chem. A, 2018,6, 12275-12280.

Shudi Lu, et al., "Qu, Recent Development in ITO-free Flexible Polymer Solar Cells", Polymers 2018, 10, 5; doi:10.3390/polym10010005.

\* cited by examiner

[Figure 1]
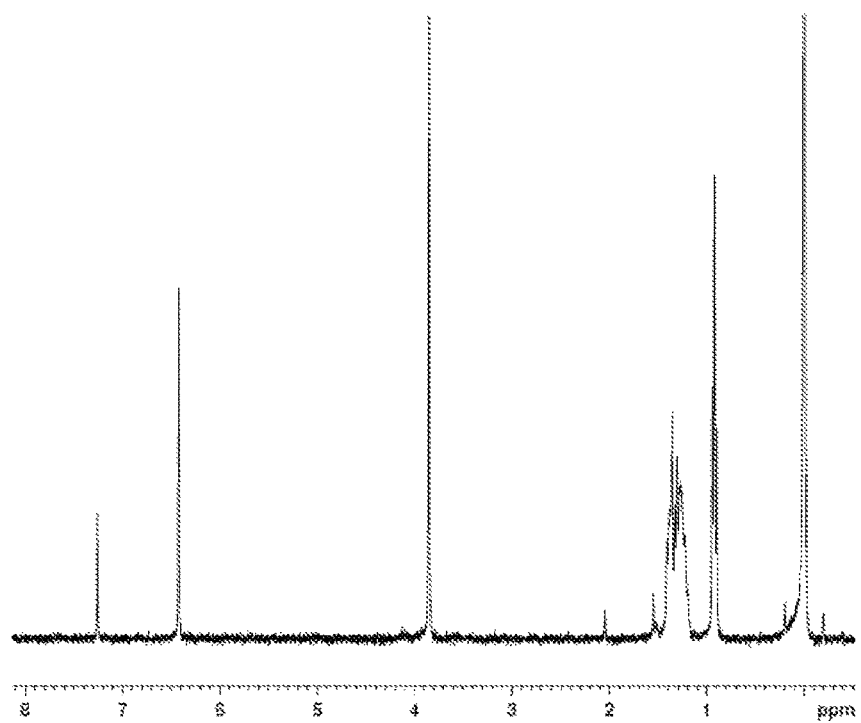
$^1$H-NMR (300MHz, CDCl$_3$): 6.42(s, 2H), 3.85 (s, 4H), 1.46-1.15 (m, 12H), 0.98-0.86 (t, 6H)

[Figure 2]
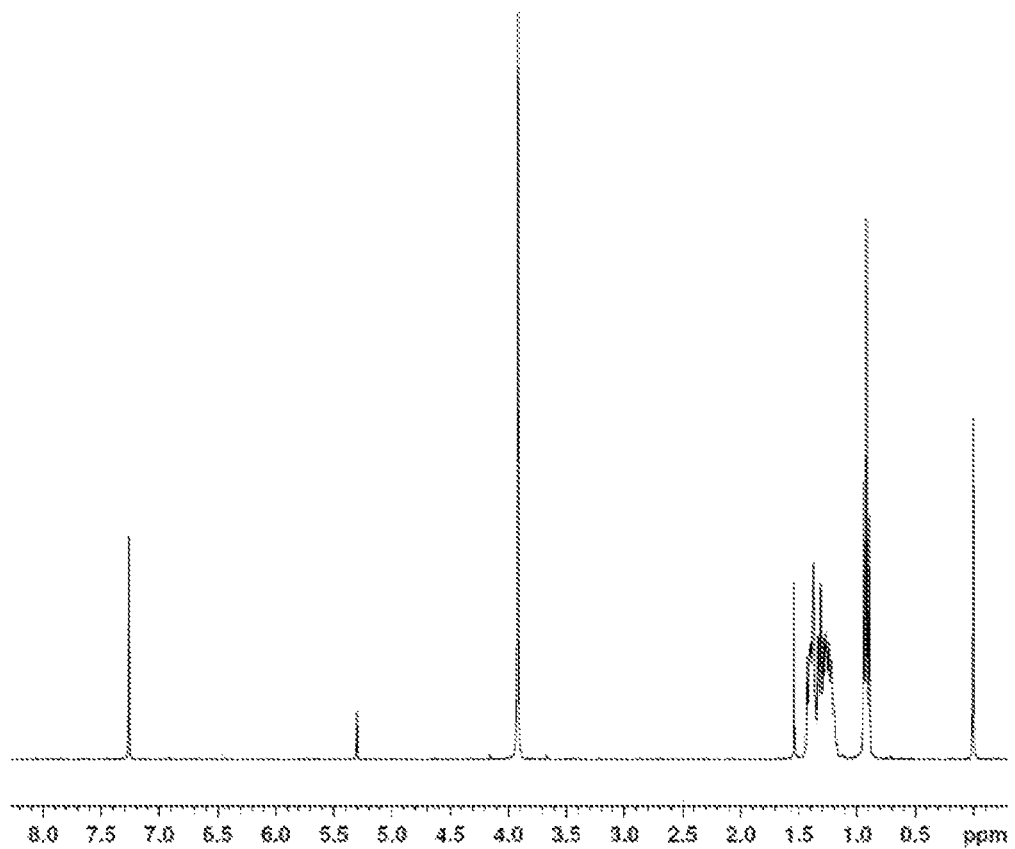
¹H-NMR (300MHz, CDCl₃); 3.92 (s, 4H), 1.46-1.15 (m, 12H), 0.98-0.86 (t, 6H)

[Figure 3]
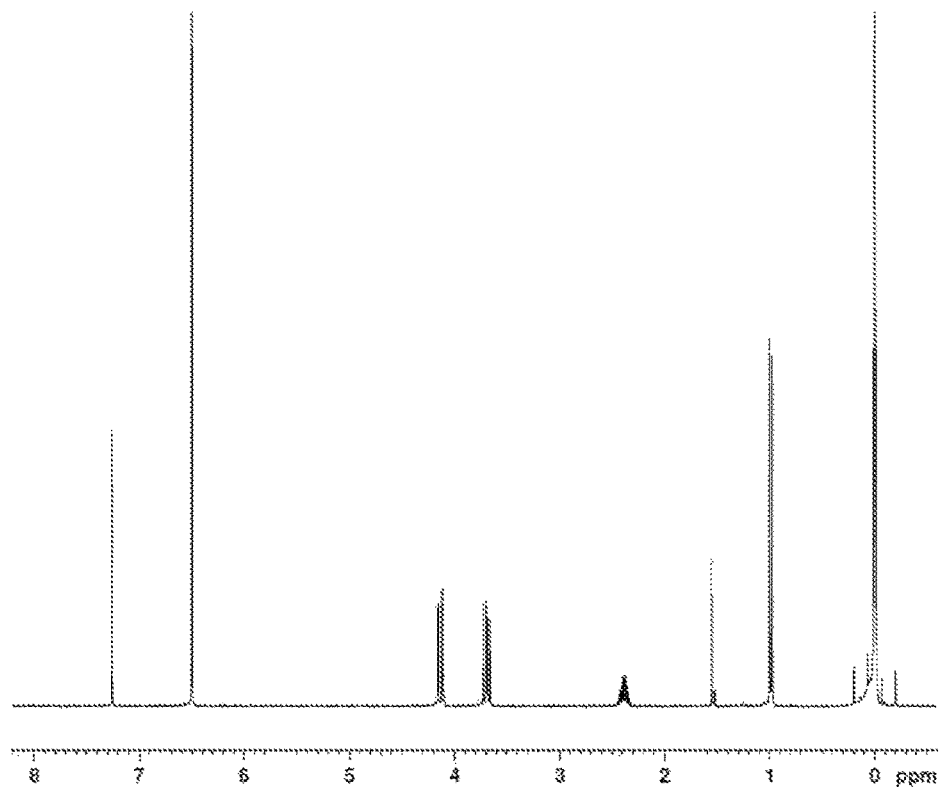
¹H-NMR
(300MHz, CDCl₃); 6.50(s, 2H), 4.18-4.09(q, 2H), 3.75-3.64(q, 2H), 2.46-2.31(m, 1H), 1.03-0.95 (d, 3H)

[Figure 4]
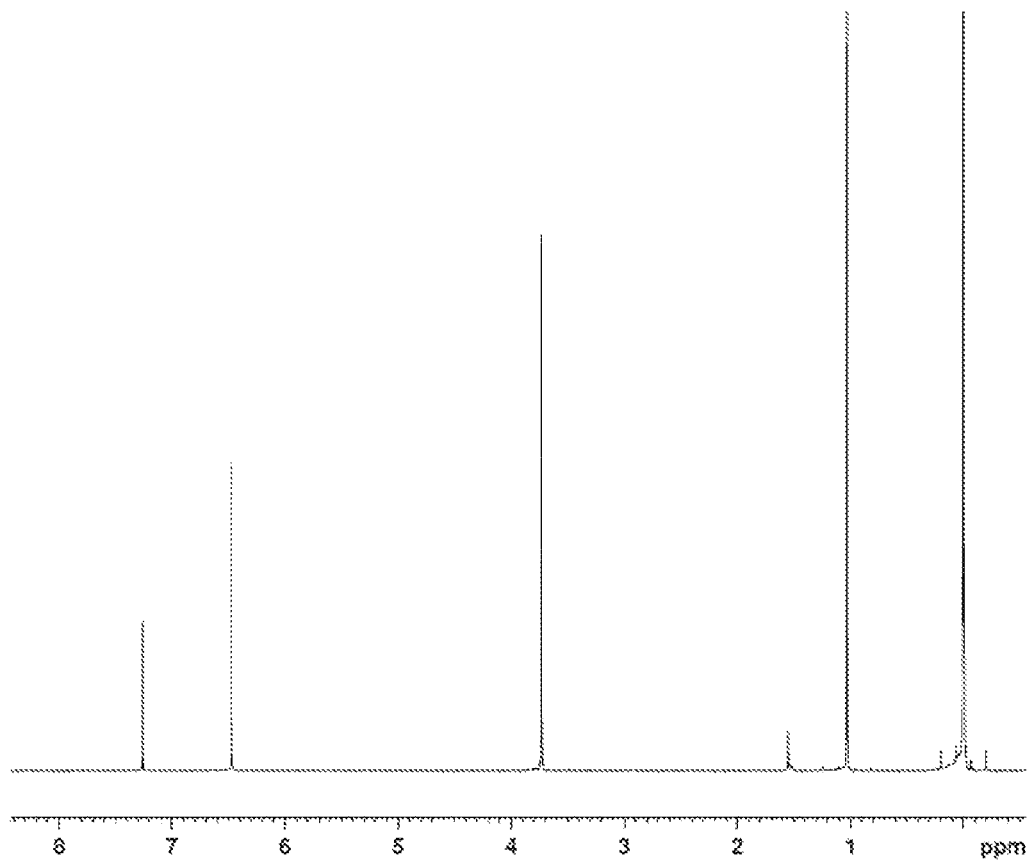
¹H-NMR (300MHz, CDCl₃); 6.48(s, 2H), 3.73(s, 4H), 1.03(s, 6H)

[Figure 5]
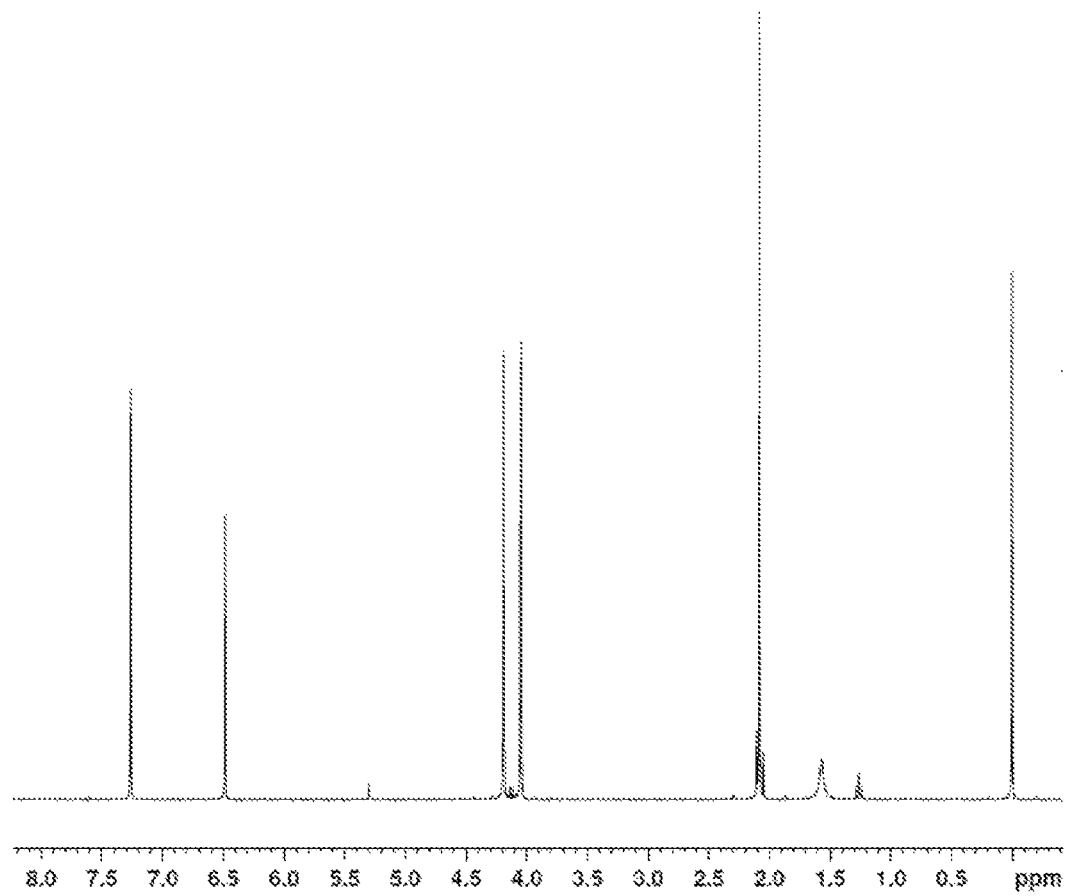
$^1$H-NMR (300MHz, CDCl$_3$); 6.49(s, 2H), 4.19 (s, 4H), 4.05 (s, 4H), 2.08 (t, 6H)

[Figure 6]
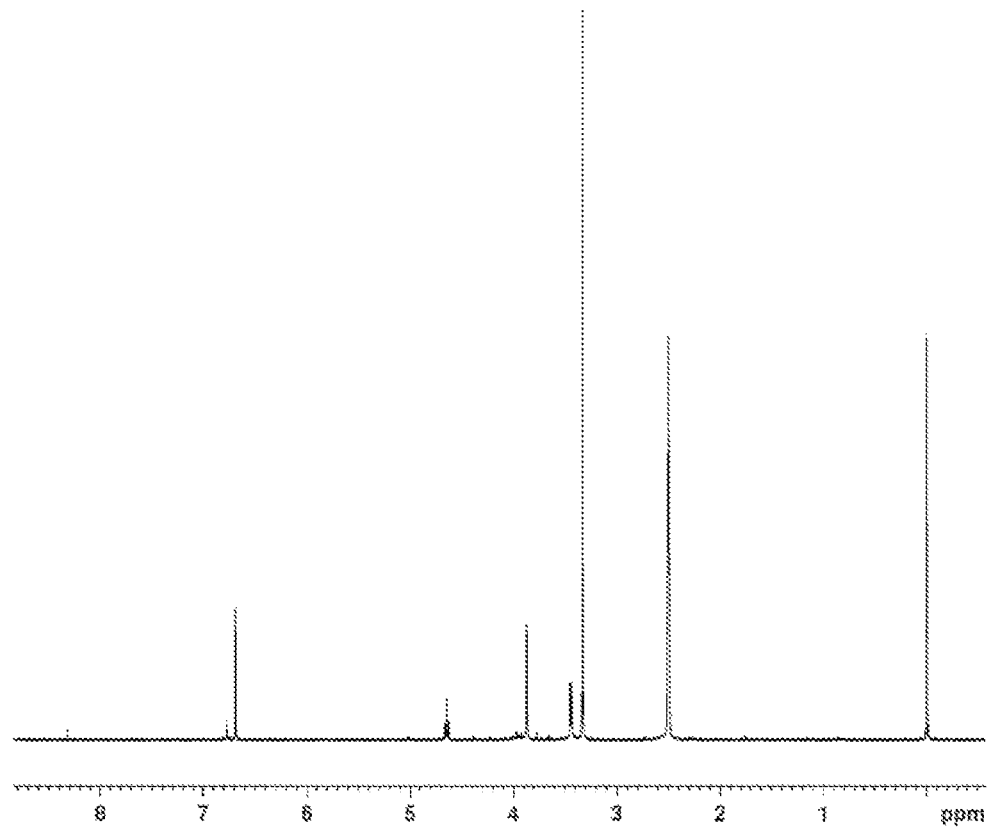
¹H-NMR (300MHz, DMSO-d₆): 6.69(s, 2H), 4.65 (t, 2H), 3.88 (s, 4H), 3.49-3.40(d, 4H)

[Figure 7]
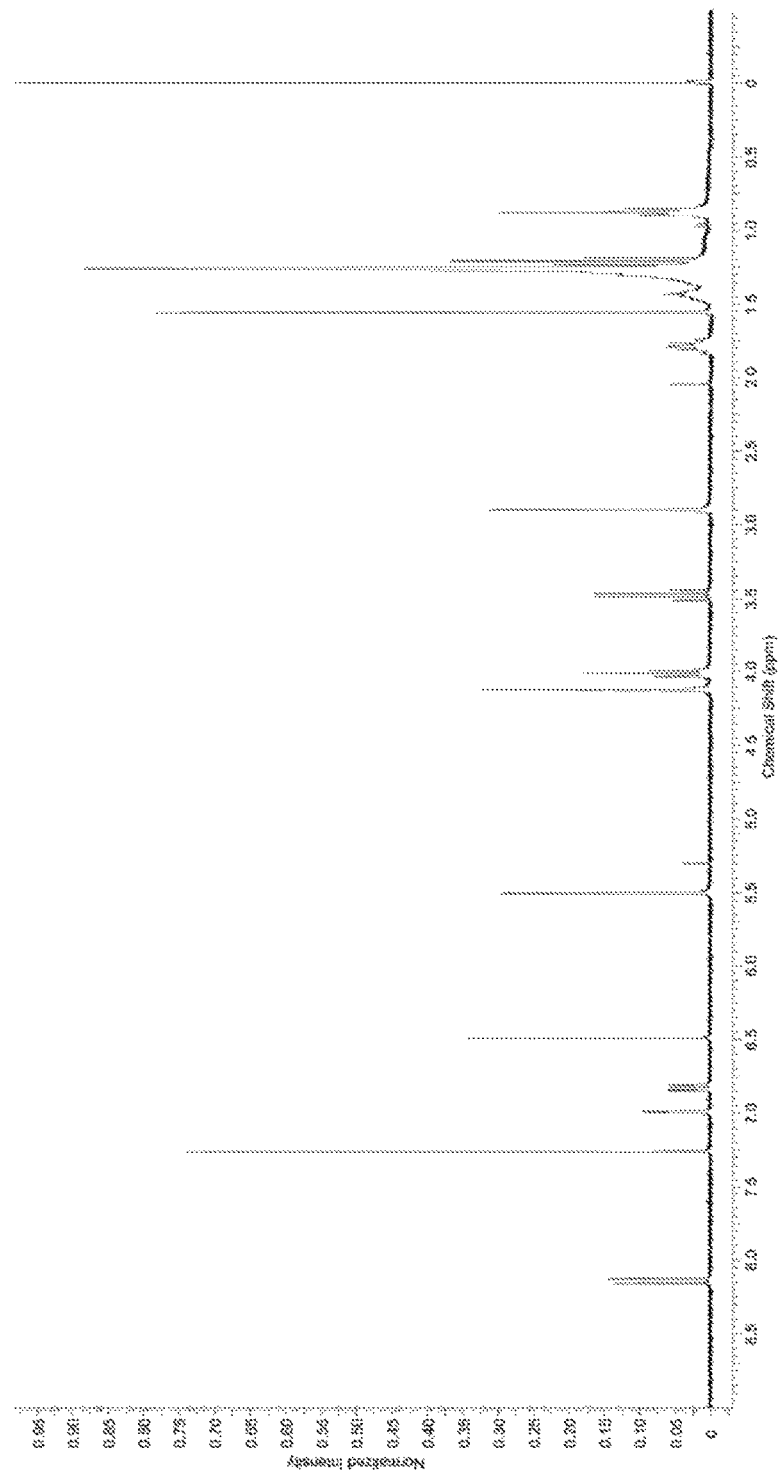

[Figure 8]
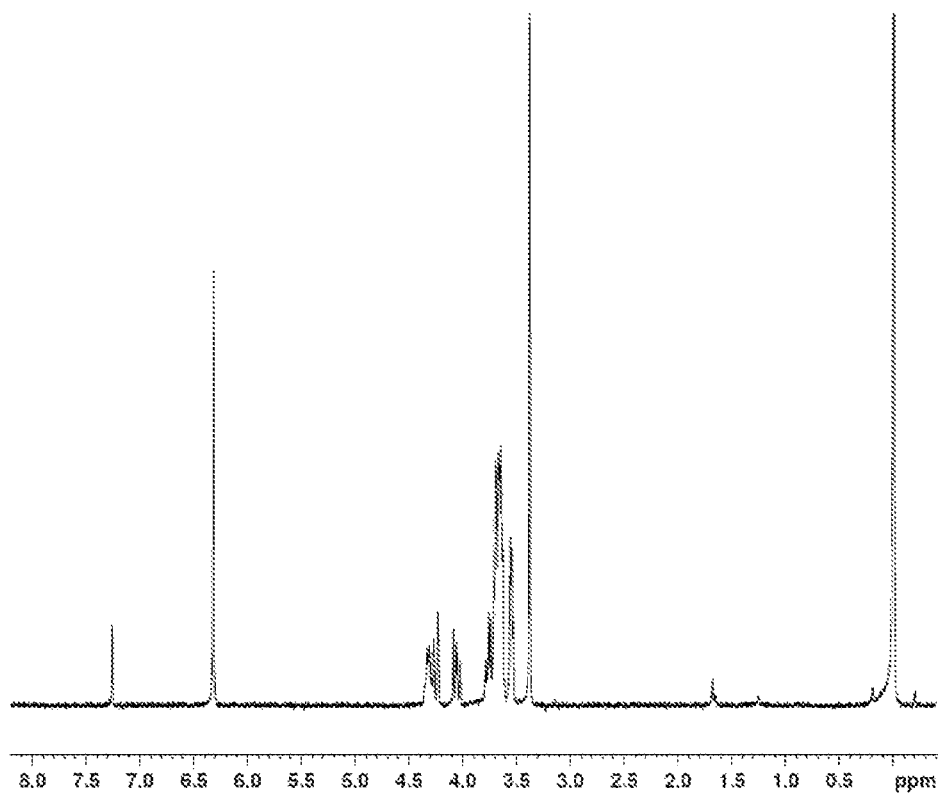
¹H-NMR (300MHz, CDCl₃): 6.32(s, 2H), 4.39-4.29 (m, 2H), 4.12-3.99(m, 1H), 3.84-3.62(m, 8H), 3.59-3.49(m, 2H), 3.38 (t, 3H)

[Figure 9]
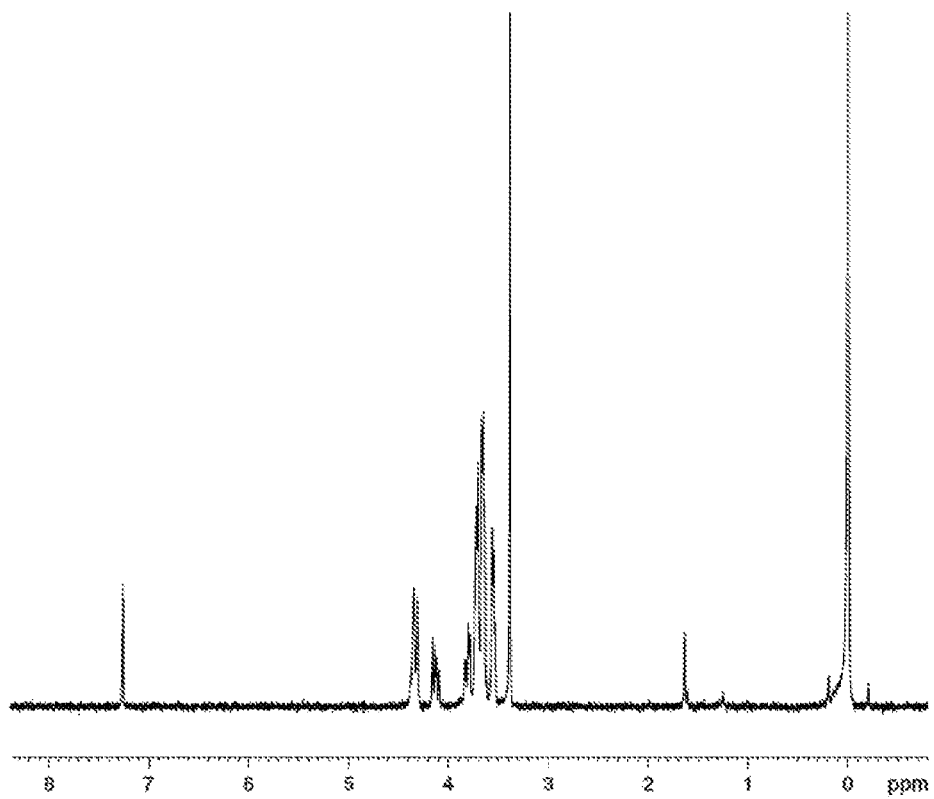
$^1$H-NMR (300MHz, CDCl$_3$): 6.32(s, 2H), 4.39-4.29 (m, 2H), 4.12-3.99(m, 1H), 3.84-3.62(m, 8H), 3.59-3.49(m, 2H), 3.38 (t, 3H)

[Figure 10]
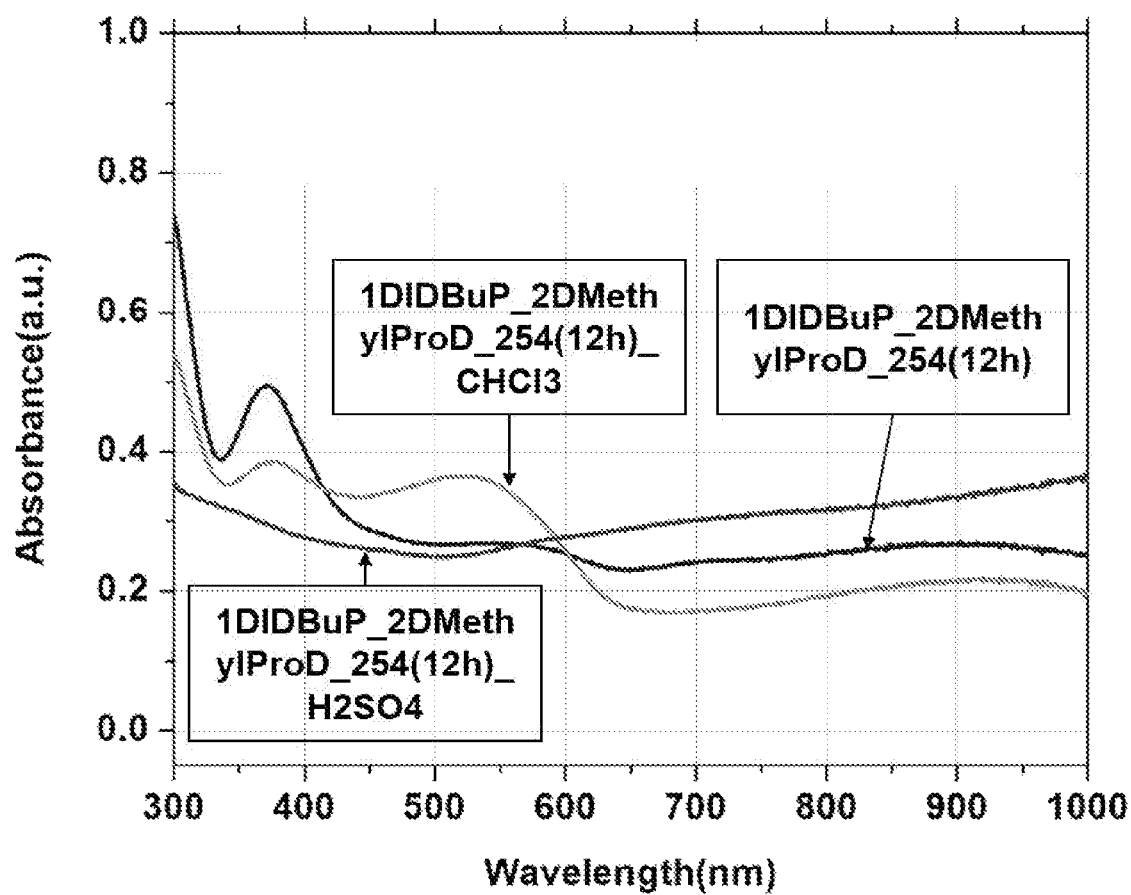

[Figure 11(a)]
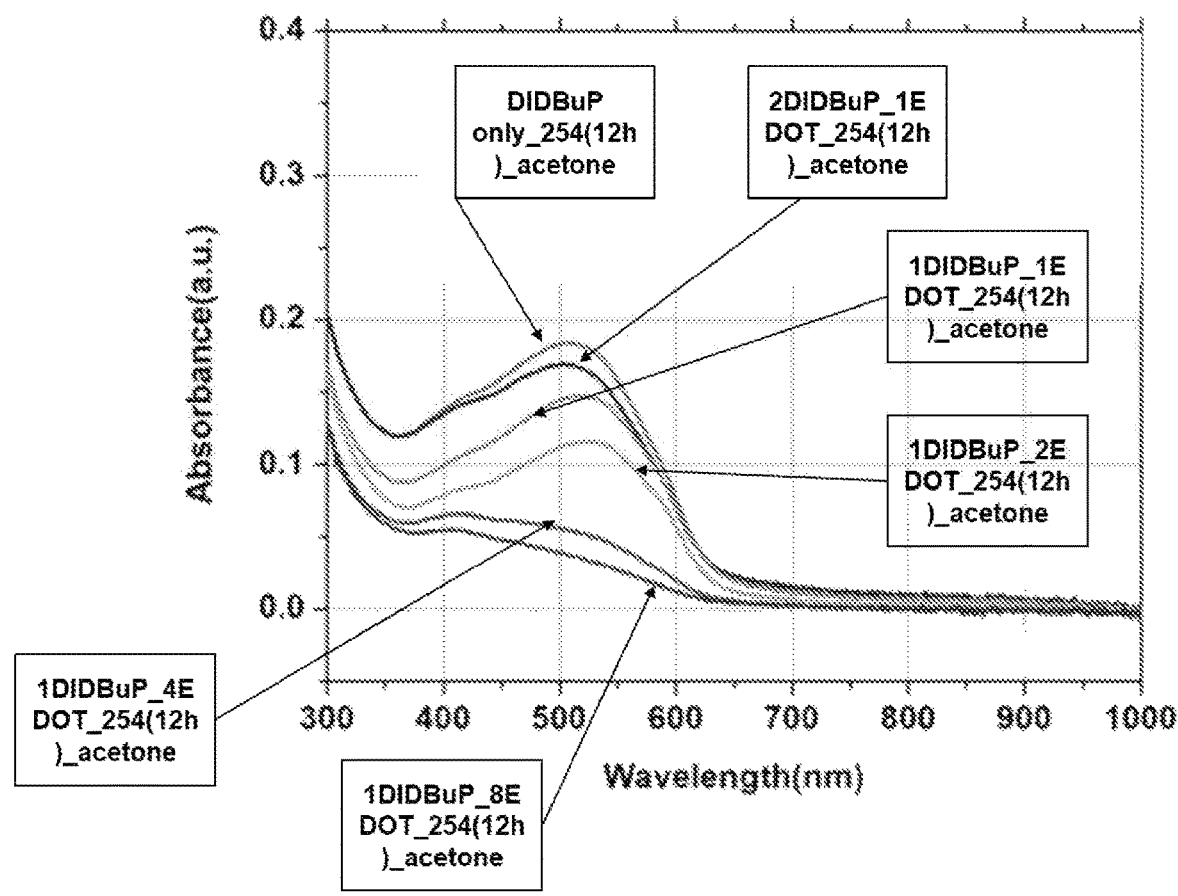

[Figure 11(b)]
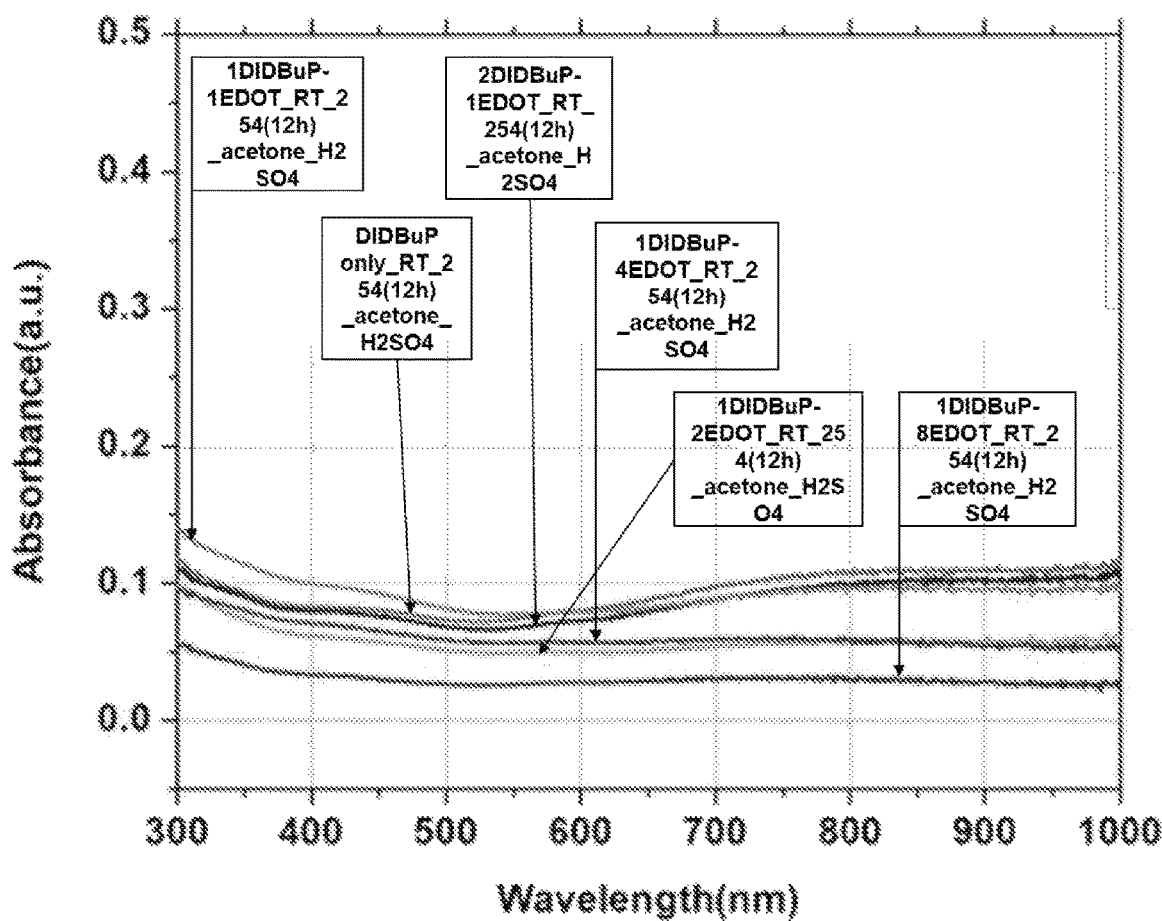

[Figure 12(a)]
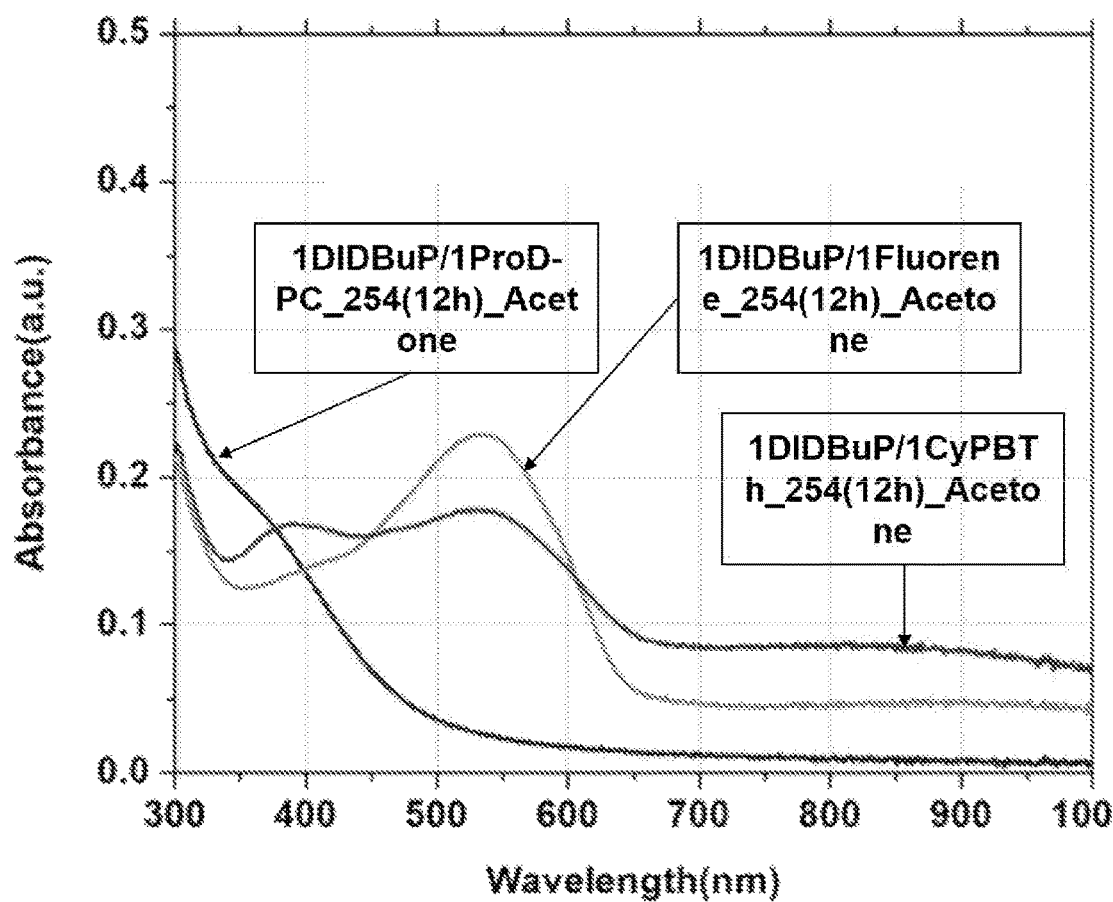

[Figure 12(b)]
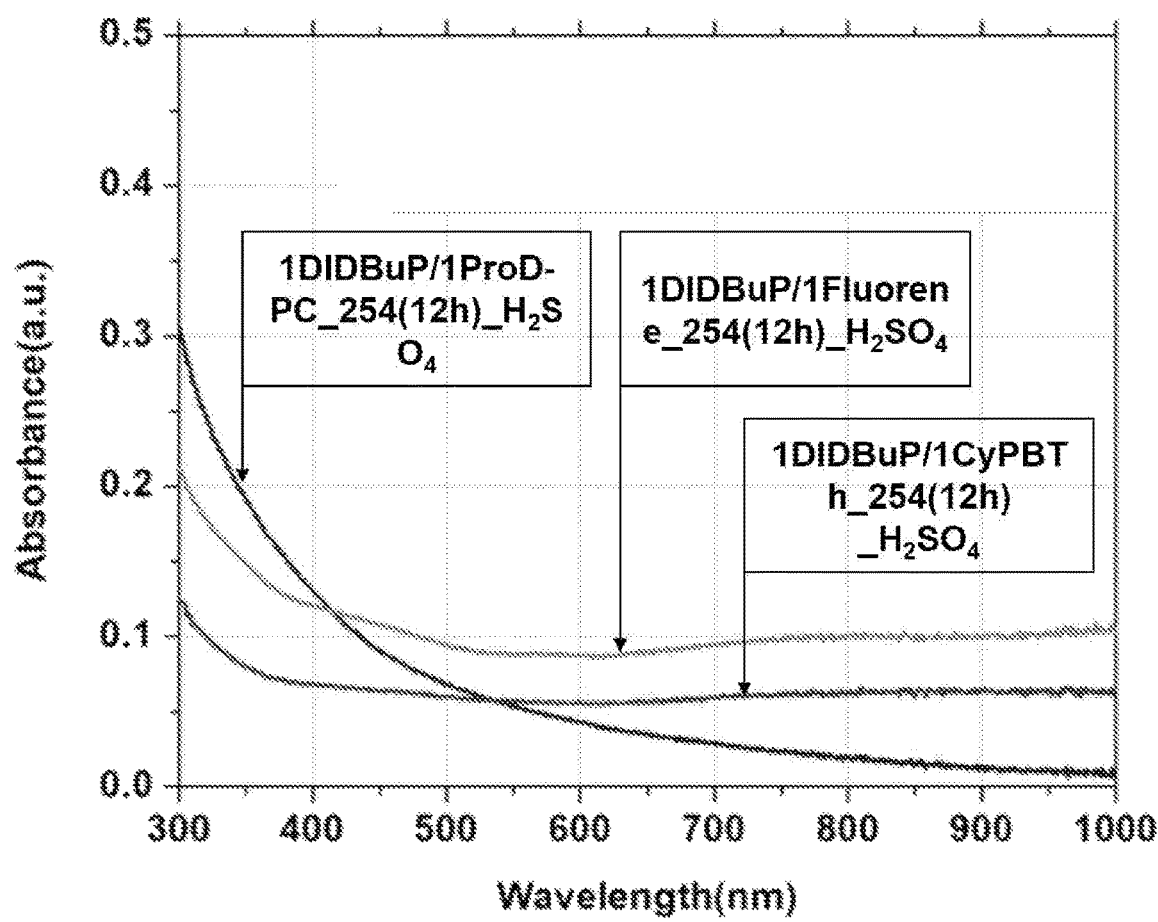

[Figure 12(c)]
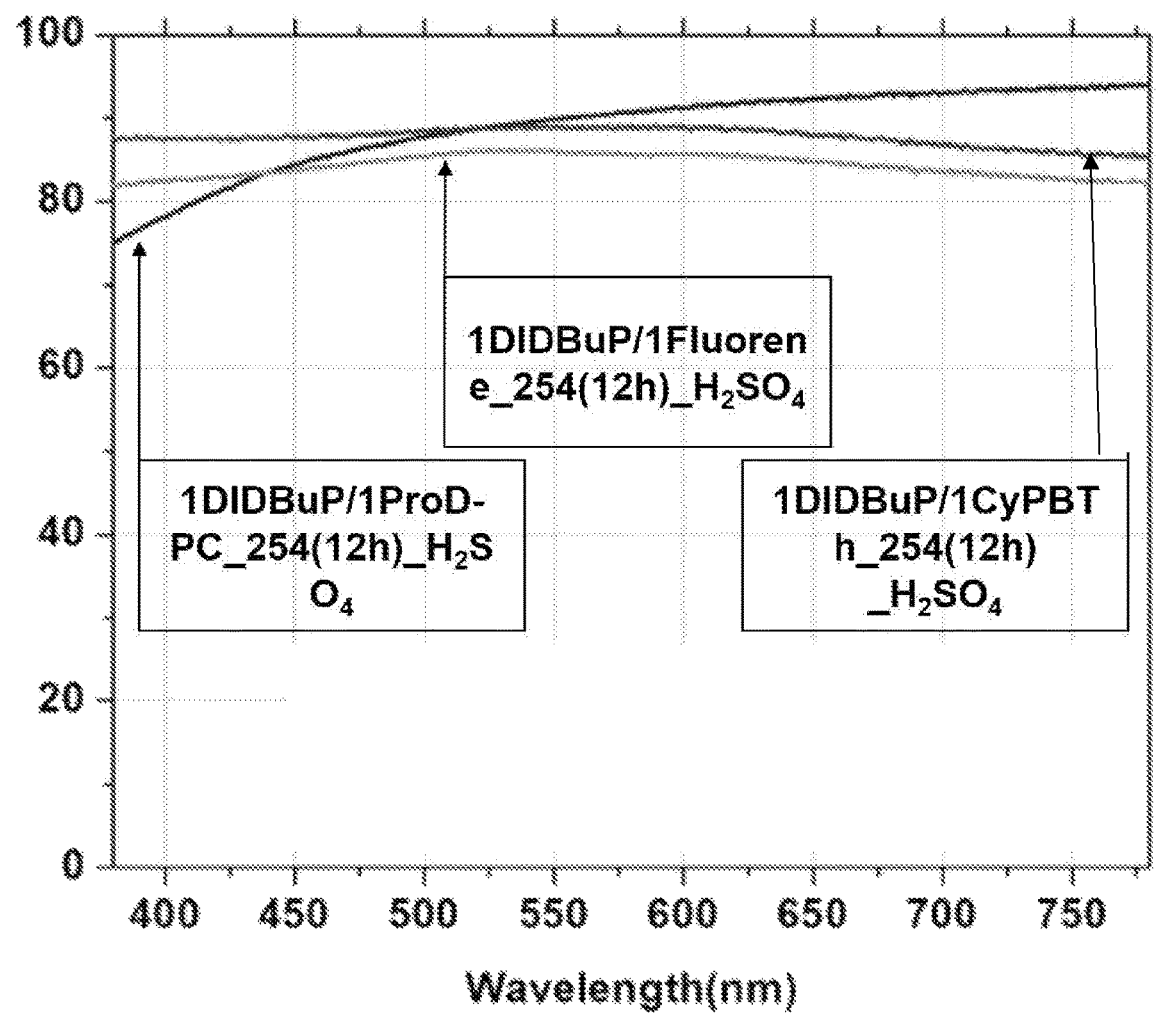

[Figure 13]
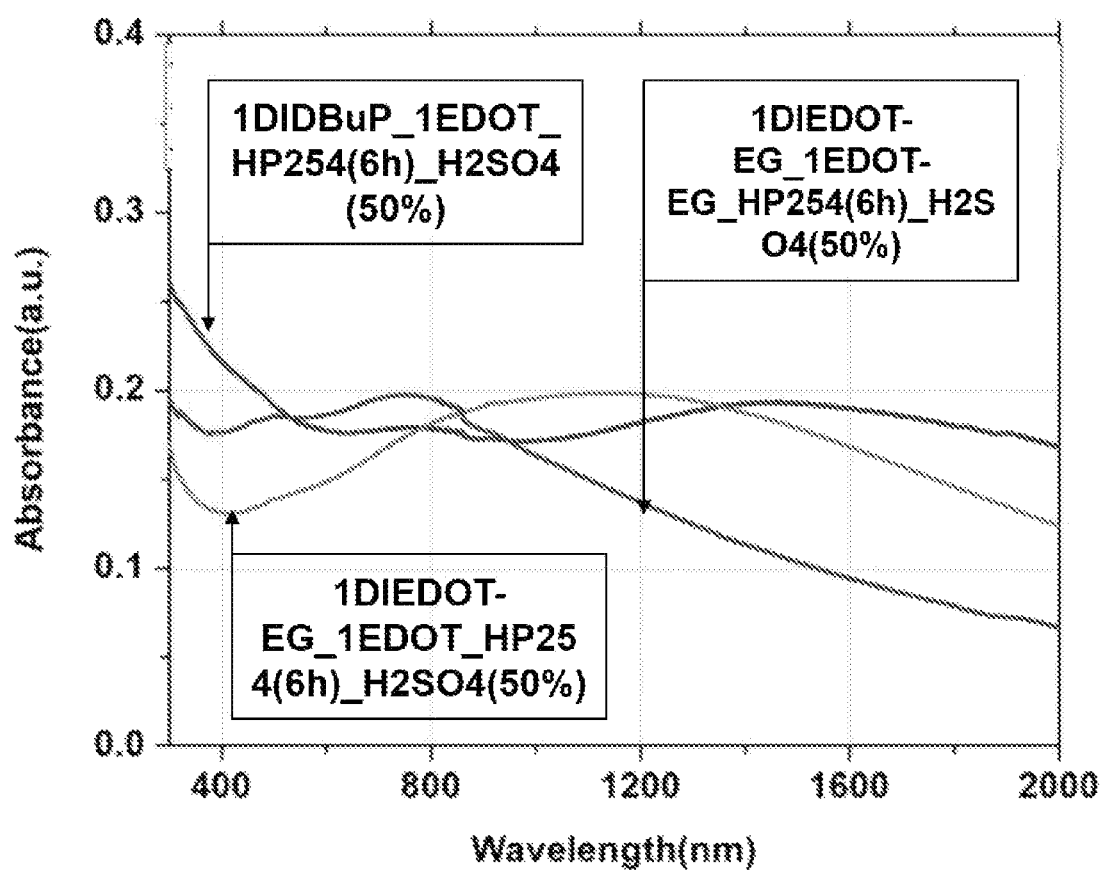

[Figure 14]
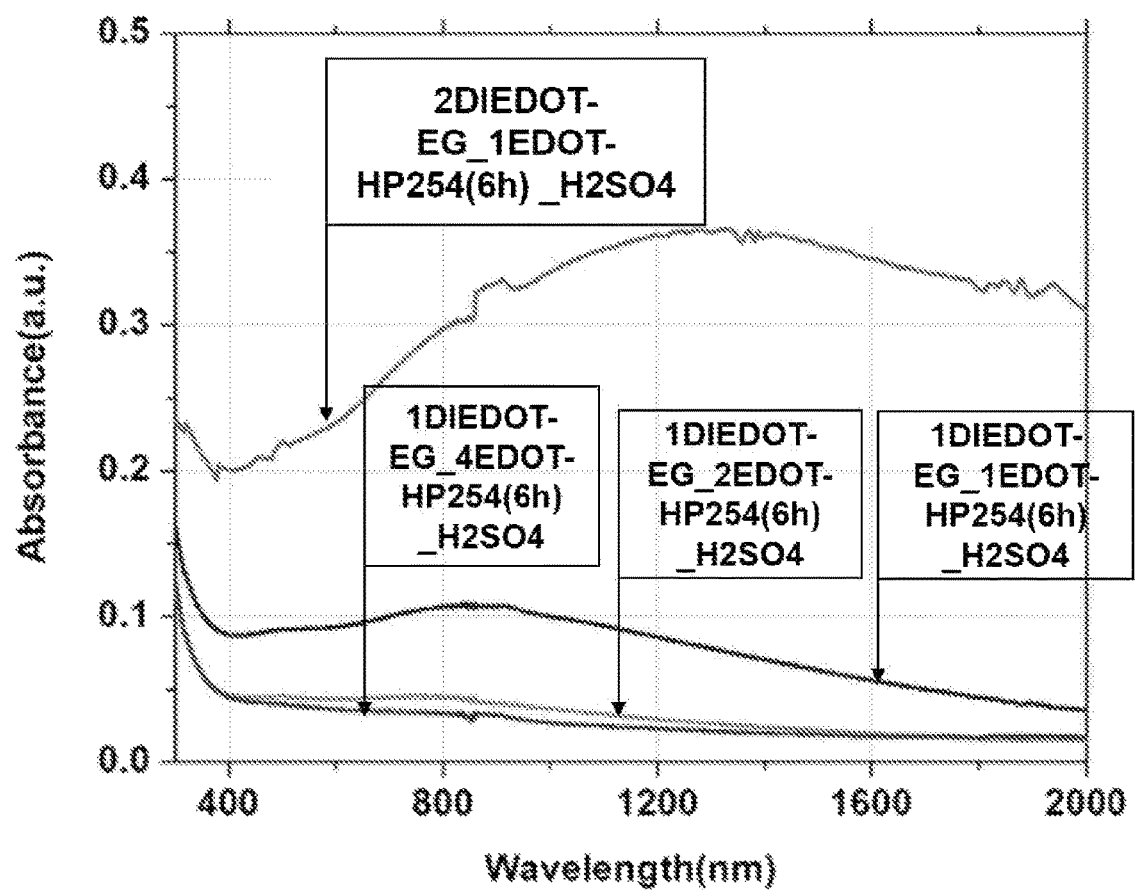

PREPARATION METHOD OF POLYMER

FIELD

The present application relates to a method for preparing a polymer, a method for preparing a conductive polymer film, a polymer and a conductive polymer film.

BACKGROUND

Various methods of synthesizing polythiophene which is a conductive polymer are known, and representative methods are a method of using an oxidation reaction and a method of using a radical reaction.

In the method of using an oxidation reaction, thiophene monomers dissolved or dispersed in a solvent are oxidized, and then polythiophene is produced through a coupling reaction between the oxidized monomers. In this method, the polymerization is performed by adding an oxidant to a solvent and applying an external magnetic field thereto, but the polymer produced by the polymerization is in a doping state, and thus a phenomenon that polymerized chains tend to bind easily to each other occurs, whereby there is a problem that the solubility in the solvent is lowered as the polymerization proceeds. Accordingly, it is difficult to obtain a high molecular weight product because the product having a molecular weight of a certain level or more is precipitated.

A method for preparing a conductive polymer by applying a metal ligand catalyst is also known, and in this method, oxygen and water must not only be sufficiently removed during the polymerization process, but also their inflow must be blocked during the reaction, so that the process is complicated and it is also not easy to completely remove the applied catalyst after the polymer polymerization.

A method for preparing a polymer by inducing an oxidation reaction through light irradiation is also known, but in this method, it is also difficult to obtain a high molecular weight product, where a redox catalyst is required for polymerization, but it is also difficult to remove the catalyst in the product.

SUMMARY

The present application relates to a method for preparing a polymer, a method for preparing a conductive polymer film, a polymer and a conductive polymer film. It is one object of the present application to provide a preparation method capable of preparing a desired polymer or conductive polymer film with excellent polymerization efficiency and conversion rates without consumption or modulation in the polymerization process. It is another object of the present application to provide a method for preparing a polymer or a conductive polymer film having a desired level of transparency and conductivity, wherein desired physical properties such as solubility in a solvent or resistance to a solvent are effectively imparted thereto as necessary.

BRIEF DESCRIPTION OF THE DRAWINGS

FIG. 1 is $^1$H-NMR spectrum results for Synthesis Example 1, scheme 1, compound 1a.

FIG. 2 is $^1$H-NMR spectrum results for Synthesis Example 1, scheme 1, compound 1.

FIG. 3 is $^1$H-NMR spectrum results for Synthesis Example 2, scheme 2, compound 2.

FIG. 4 is $^1$H-NMR spectrum results for Synthesis Example 3, scheme 3, compound 3.

FIG. 5 is $^1$H-NMR spectrum results for Synthesis Example 4, scheme 4, compound 6a.

FIG. 6 is $^1$H-NMR spectrum results for Synthesis Example 4, scheme 4, compound 6.

FIG. 7 is $^1$H-NMR spectrum results for Synthesis Example 5, scheme 5, compound 8.

FIG. 8 is $^1$H-NMR spectrum results for Synthesis Example 6, scheme 6, compound 9a.

FIG. 9 is $^1$H-NMR spectrum results for Synthesis Example 6, scheme 6, compound 9.

FIG. 10 is UV absorption spectra analysis results for polymer films formed according to embodiments of the invention.

FIGS. 11a-11b are UV absorption spectra analysis results for polymer films formed according to other embodiments of the invention.

FIGS. 12a-12c depict optical characteristics of the embodiments of Examples 9-11.

FIG. 13 depicts optical characteristics of the embodiments of Examples 12-13.

FIG. 14 depicts optical characteristics of the embodiments of Examples 14-16.

DETAILED DESCRIPTION

Among physical properties mentioned in this specification, when the measured temperature and/or pressure affects the physical property value, the relevant physical property means a physical property measured at room temperature and/or normal pressure, unless otherwise specified.

In the present application, the term room temperature is a natural temperature without warming or cooling, which may mean, for example, any temperature in a range of about 10° C. to about 30° C., or a temperature of 25° C. or 23° C. or so.

In the present application, the term normal pressure is a pressure when it is not particularly reduced or increased, which may be about one atmosphere or so, usually, such as atmospheric pressure.

In the present application, the term alkyl group, alkylene group or alkoxy group may mean a linear or branched alkyl group, alkylene group or alkoxy group, having 1 to 20 carbon atoms, 1 to 16 carbon atoms, 1 to 12 carbon atoms, 1 to 8 carbon atoms or 1 to 4 carbon atoms, or may mean a cyclic alkyl group, alkylene group or alkoxy group, having 3 to 20 carbon atoms, 3 to 16 carbon atoms, 3 to 12 carbon atoms, 3 to 8 carbon atoms or 3 to 6 carbon atoms, unless otherwise specified.

In the present application, the term alkenyl group, alkenylene group, alkynyl group or alkynylene group may mean a linear or branched alkenyl group, alkenylene group, alkynyl group or alkynylene group, having 2 to 20 carbon atoms, 2 to 16 carbon atoms, 2 to 12 carbon atoms, 2 to 8 carbon atoms or 2 to 4 carbon atoms, or may mean a cyclic alkenyl group, alkenylene group, alkynyl group or alkynylene group, having 3 to 20 carbon atoms, 3 to 16 carbon atoms, 3 to 12 carbon atoms, 3 to 8 carbon atoms or 3 to 6 carbon atoms, unless otherwise specified.

In this specification, the term aryl group or arylene group means a monovalent or divalent substituent derived from benzene or a derivative thereof a compound in which two or three or more benzenes are each bonded while sharing one carbon atom, or a derivative thereof or a compound in which two or three or more benzenes are each bonded by an arbitrary linker, or a derivative thereof. The aryl group or arylene group may be an aryl group or arylene group having 6 to 30 carbon atoms, 6 to 24 carbon atoms, 6 to 18 carbon atoms or 6 to 12 carbon atoms. The aryl group or arylene group may also be optionally substituted by one or more substituents.

The term condensed cyclic compound means a polycyclic aromatic hydrocarbon compound, a condensed heterocyclic compound or a condensed cyclic thiophene compound. The polycyclic aromatic hydrocarbon compound means a compound comprising a benzene structure and other hydrocarbon rings which share two carbon atoms with the benzene structure and are bonded thereto, or a derivative thereof. The other hydrocarbon ring may also be an aromatic ring, and may also be an aliphatic ring structure. The polycyclic aromatic hydrocarbon compound may be exemplified by anthracene, pyrene, pentacene, pentacene, fluorine and/or benzofluorene, and the like, but is not limited thereto. The condensed heterocyclic compound means a compound having a heterocyclic structure and a hydrocarbon ring or a heterocyclic ring which shares two carbon atoms with the heterocyclic structure and is bonded thereto, or a derivative thereof. Strictly, the condensed cyclic thiophene compound also belongs to the category of the condensed heterocyclic compound, but in this specification, the condensed heterocyclic compound means a condensed heterocyclic compound except for the condensed cyclic thiophene compound. The heterocyclic structure may be exemplified by a pyrrole structure or an aniline structure, and the like, but is not limited thereto. The condensed cyclic thiophene compound means a compound comprising a thiophene structure and hydrocarbon ring, hetero ring or other thiophene structures which share two carbon atoms with the thiophene structure and are bonded thereto, or a derivative thereof. Such a compound may be exemplified by cyclopenta[1,2-b:5,4-b] bisthiophene or benzothiophene, and the like, but is not limited thereto. The condensed cyclic compound may have ring forming atoms in a range of 10 to 30. In the polycyclic aromatic hydrocarbon compound, the ring forming atoms may be carbon atoms; in the condensed heterocyclic compound, the ring forming atoms may be carbon atoms and heteroatoms (e.g., oxygen atoms, nitrogen atoms, phosphorus atoms and/or sulfur atoms, etc.); and in the condensed cyclic thiophene compound, the ring forming atoms may be sulfur atoms and carbon atoms or sulfur atoms and carbon atoms and heteroatoms except for sulfur.

The term amino group represents a functional group represented by $-NR_2$, wherein R may be hydrogen, an alkyl group, an alkoxy group or an aryl group.

The term azide group represents a functional group represented by $-N_3$.

In the range of the term alkylsilyl group, a monoalkylsilyl group, a dialkylsilyl group and a trialkylsilyl group is included.

The above-mentioned alkyl group, alkylene group, alkoxy group, alkenyl group, alkynylene group, alkynyl group, alkynylene group, arylene group and/or aryl group may also be optionally substituted with one or more substituents, where the substituent can be exemplified by a glycidyl group, a glycidoxyalkyl group, an acryloyl group, a methacryloyl group, an acryloyloxy group, a methacryloyloxy group, a hydroxy group, a carboxyl group, an epoxy group, an alkyl group, an alkylene group, an alkoxy group, an alkenyl group, an alkynylene group, an alkynyl group, an alkynylene group and/or an aryl group, and the like, but is not limited thereto.

One aspect of the present application relates to a method for preparing a polymer, and in one example, the polymer may be a conductive polymer.

The conductive polymer may be polythiophene. The term polythiophene means a polymer comprising a polymerized unit of a thiophene series monomer in an amount of about 50 mol % or more, 55 mol % or more, 60 mol % or more, 65 mol % or more, 70 mol % or more, 75 mol % or more, 80 mol % or more, 85 mol % or more, or 90 mol % or more, based on the entire polymerized unit of the polymer. The upper limit of the polymerized unit ratio of the thiophene series monomer in the polythiophene is not particularly limited, which may be, for example, about 100 mol % or less, 95 mol % or less, or 90 mol % or less or so. Here, the thiophene series monomer may be exemplified by a compound of Formula 1, 2 or 4, or a condensed cyclic thiophene compound as described below.

In the present application, a polymer is prepared based on photo-polymerization, and in particular, a polymer is prepared by applying a monomer mixture which is composed to occur only or predominantly a photoarylation reaction in the photopolymerization process. According to the method of the present application, it is possible to obtain a polymer having a large molecular weight of a desired level, exhibiting high conductivity and having excellent transparency or the like. Also, copolymerization between various two or more monomers can also proceed freely, through which necessary physical properties such as solubility or resistance to the solvent can be secured efficiently by way of the polymer design. Furthermore, in the case of the method of the present application, the use of the catalyst in the polymerization process is unnecessary or the use thereof can be minimized, and thus the amount of the catalyst which adversely affects the physical properties in the product can be minimized or substantially eliminated. In addition, in the case of the method of the present application, it is possible to effectively form a pattern of a conductive polymer that is difficult to obtain a conductive polymer dispersion in a solution state as a polymer having poor solubility in a solvent. That is, for example, PEDOT (poly(3,4-ethylenedioxythiophene)), which is a typical conductive polymer, has poor solubility in a solvent, so that it is not easy to obtain a PEDOT dispersion in a solution state, but EDOT (3,4-ethylenedioxythiophene), which is a monomer forming the PEDOT, has good solubility in a solvent. Therefore, when the EDOT is applied to the method of the present application, it is possible to form a pattern of a polymer comprising the EDOT unit, whereby electro-optical characteristics equivalent to or higher than those expected by the PEDOT can be secured. In addition, the application of the solid phase polymerization method according to the present application can be expected so that the polymer formed in the solid phase has excellent solvent resistance, whereby a fine pattern or a circuit can be formed effectively by a photomasking process or the like.

This preparation method of the present application comprises a step of irradiating a monomer mixture with light. Here, the monomer mixture may comprise at least two different monomers.

For example, the monomer mixture may comprise first and second monomers, where the first monomer may comprise a compound of Formula 1 and the second monomer may comprise a compound of Formula 2 or the above-described condensed cyclic compound.

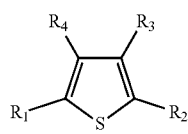

[Formula 1]

In Formula 1, $R_1$ and $R_2$ may each independently be hydrogen or a halogen atom, and $R_3$ and $R_4$ may each independently be hydrogen or a flowable functional group, or may be linked to each other to form an alkylenedioxy group substituted with the flowable functional group.

In one example, the alkylene group in the alkylenedioxy group formed by linking $R_3$ and $R_4$ in Formula 1 to each other may be an alkylene group having 2 to 20 carbon atoms, 2 to 16 carbon atoms, 2 to 12 carbon atoms, 2 to 8 carbon atoms or 2 to 4 carbon atoms, where this alkylene group may be linear or branched.

The flowable functional group is a functional group capable of imparting mobility to the monomer mixture. The monomer containing such a flowable functional group imparts proper mobility to the monomer mixture and also diffuses in the monomer mixture so that the polymerization can occur with good efficiency.

The specific kind of such a flowable functional group is not particularly limited as long as it plays the above role, but the inventors of the present application have generally confirmed that a chain having a length of a certain level or more effectively imparts mobility in the method of the present application.

Such a flowable functional group may be exemplified by an alkyl group having 3 or more carbon atoms, an alkoxy group having 3 or more carbon atoms, an alkylcarbonyl group having 3 or more carbon atoms (an alkylcarbonyl group having an alkyl group with 3 or more carbon atoms), an alkylcarbonyloxy having 3 or more carbon atoms (an alkylcarbonyloxy group having an alkyl group with 3 or more carbon atoms) or a functional group of Formula 3 below, and in general, an alkyl group having 3 or more carbon atoms, an alkoxy group having 3 or more carbon atoms and/or a functional group of Formula 3 below may be used, without being limited thereto.

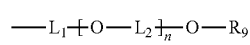

[Formula 3]

In Formula 3, $L_1$ is a single bond or an alkylene group, $L_2$ is an alkylene group, $R_9$ is an alkyl group, and n is a number in a range of 1 to 10.

In one example, the carbon number of the alkyl group (excluding $R_9$ of Formula 3) or the alkoxy group may be 4 or more, 5 or more, or 6 or more, and the carbon number may also be 20 or less, 18 or less, 16 or less, 14 or less, 12 or less, 10 or less, 8 or less, 6 or less, or about 5 or less or so. The alkyl group may be linear, branched or cyclic, and suitably, may be linear or branched.

In one example, the alkyl group of $R_9$ in Formula 3 may be an alkyl group having 1 to 20 carbon atoms, 1 to 16 carbon atoms, 1 to 12 carbon atoms, 1 to 8 carbon atoms or 1 to 4 carbon atoms, or may be a methyl group or an ethyl group. The alkyl group may be linear, branched or cyclic, and suitably, may be linear or branched.

In one example, the alkylene group of $L_1$ and $L_2$ in Formula 3 may be an alkylene group having 1 to 20 carbon atoms, 1 to 16 carbon atoms, 1 to 12 carbon atoms, 1 to 8 carbon atoms or 1 to 4 carbon atoms, or may be an alkylene having 2 to 4 carbon atoms. The alkylene group may be linear, branched or cyclic, and suitably, may be linear or branched.

The compound (monomer) of Formula 1 may impart the above-mentioned mobility through the flowable functional group. Accordingly, at least one of $R_3$ and $R_4$ of Formula 1 may be the flowable functional group, or the $R_3$ and $R_4$ may be linked to form the alkylenedioxy group substituted with the flowable functional group.

The first monomer may comprise only the compound of Formula 1, or comprise two compounds having different structures within the category represented by Formula 1, or also comprise compounds having other structures that do not belong to the category of Formula 1, together with the compound of Formula 1.

The flowable functional group included in Formula 1 imparts mobility to a monomer mixture and/or a composition, which is polymerized, comprising the same, where the ratio thereof may be adjusted for this purpose.

For example, if the second monomer to be described below comprises a compound of Formula 2, the molar ratio (=100×molar number of functional group/(total molar number of $R_3$, $R_4$, $R_8$ and $R_8$)) of the flowable functional group to the total molar number in the monomer mixture of $R_3$ and $R_4$ of Formula 1 and $R_7$ and $R_8$ of Formula 2 may be in a range of 1 mol % to 100 mol %. In another example, the molar ratio may be 3 mol % or more, 5 mol % or more, 7 mol % or more, 10 mol % or more, 15 mol % or more, 20 mol % or more, 25 mol % or more, 30 mol % or more, 35 mol % or more, 40 mol % or more, 45 mol % or more, 50 mol % or more, 55 mol % or more, 60 mol % or more, 65 mol % or more, or may be 95 mol % or less, 90 mol % or less, 85 mol % or less, 80 mol % or less, 75 mol % or less, 70 mol % or less, 65 mol % or less, 60 mol % or less, 55 mol % or less, 55 mol % or less, 50 mol % or less, 45 mol % or less, 40 mol % or less, 35 mol % or less, 30 mol % or less, 25 mol % or less, 20 mol % or more, or 15 mol % or more.

If the second monomer does not contain a compound of Formula 2, the molar ratio (=100×molar number of flowable functional group/(total molar number of $R_3$ and $R_4$)) of the flowable functional group to the total molar number in the monomer mixture of $R_3$ and $R_4$ of Formula 1 may be in a range of 1 mol % to 100 mol %. In another example, the molar ratio may be 3 mol % or more, 5 mol % or more, 7 mol % or more, 10 mol % or more, 15 mol % or more, 20 mol % or more, 25 mol % or more, 30 mol % or more, 35 mol % or more, 40 mol % or more, 45 mol % or more, 50 mol % or more, 55 mol % or more, 60 mol % or more, 65 mol % or more, or may be 95 mol % or less, 90 mol % or less, 85 mol % or less, 80 mol % or less, 75 mol % or less, 70 mol % or less, 65 mol % or less, 60 mol % or less, 55 mol % or less, 55 mol % or less, 50 mol % or less, 45 mol % or less, 40 mol % or less, 35 mol % or less, 30 mol % or less, 25 mol % or less, 20 mol % or more, or 15 mol % or more.

The second monomer of the monomer mixture may comprise at least one or more compounds selected from the group consisting of a compound represented by the following Formula 2 and a condensed cyclic compound.

In one example, such a second monomer may be, for example, a monomer that improves the conductivity of the polymer. The flowable functional group included in the first monomer may impart proper mobility to the monomer mixture, but may have a relatively long chain and bulky structure, where the flowable functional group may degrade intermolecular packing efficiency, thereby resulting in a slight drop in conductivity. However, the above problem can be solved by using the second monomer at an appropriate level in combination with the first monomer. Such a second monomer may comprise a compound represented by Formula 2 below and/or a condensed cyclic compound.

[Formula 2]

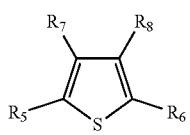

In Formula 2, $R_5$ and $R_6$ are each independently hydrogen or a halogen atom, and $R_7$ and $R_8$ are each independently hydrogen, a hydroxy group, a carboxyl group, an amino group, an azide group, an alkyl group, a hydroxyalkyl group, a carboxylalkyl group, an arylalkyloxycarbonyl group, an arylalkyloxycarbonylalkyl group, an alkylsilyloxycarbonyl group or an alkylsilyloxycarbonylalkyl group, or are linked to each other to form a substituted or unsubstituted alkylenedioxy group, ether bond-containing group or ester bond-containing group.

In one example, the alkylene group in the alkylenedioxy group formed by linking $R_7$ and $R_8$ in Formula 2 to each other may be an alkylene group having 2 to 20 carbon atoms, 2 to 16 carbon atoms, 2 to 12 carbon atoms, 2 to 8 carbon atoms or 2 to 4 carbon atoms, where this alkylene group may be linear or branched.

The specific types of the substituents $R_7$ and $R_8$ included in Formula 2 are not particularly limited as long as they fall within the above-mentioned range, but in consideration of intermolecular packing efficiency or the like, a functional group that is not bulky is suitable.

In one example, $R_7$ and $R_8$ of Formula 2 may each independently be hydrogen, a hydroxy group, a carboxyl group, an amino group, an azide group, a methyl group, an ethyl group, a hydroxymethyl group, a hydroxyethyl group, a carboxymethyl group or a carboxyethyl group, or may be linked to each other to form the unsubstituted alkylenedioxy group, or may be linked to each other to form the alkylenedioxy group, ester bond-containing group or ether bond-containing group substituted with the hydroxy group, carboxyl group, amino group, azide group, methyl group, ethyl group, hydroxymethyl group, hydroxyethyl group, carboxymethyl group and/or carboxyethyl group.

In Formula 2, $R_7$ and $R_8$ of Formula 2 may each independently be hydrogen, an amino group, an azide group, a methyl group, an ethyl group or a hydroxymethyl group, or may be linked to each other to form the unsubstituted alkylenedioxy group, or may be linked to each other to form an alkylenedioxy group substituted with the hydrogen, amino group, azide group, methyl group, ethyl group or hydroxymethyl group.

The type of the condensed cyclic compound that can be applied as the second monomer may be exemplified by all of the aforementioned condensed cyclic compounds, and for example, may be exemplified by a fluorene-based monomer such as fluorene (for example, 9H-fluorene, etc.) or a derivative thereof, a cyclopentabisthiophene-based compound such as 4H-cyclopenta[1,2-b:5,4-b]bisthiophene, and the like.

The second monomer may comprise only one monomer selected from the group consisting of the compound of Formula 2 and the condensed cyclic compound, or may also comprise two or more monomers selected from the relevant group. Also, it may comprise two compounds having different structures even within the category represented by Formula 2 above and/or the category of the condensed cyclic compound, and may also comprise compounds having different structures other than the compound of Formula 2 above and the condensed cyclic compound.

In one example, $R_3$ and $R_4$ of the compound of Formula 1 above and/or $R_7$ and $R_8$ of Formula 2 above may be linked to each other to form an alkylenedioxy group. In this case, Formula 1 or 2 above may be represented by Formula 4 below.

[Formula 4]

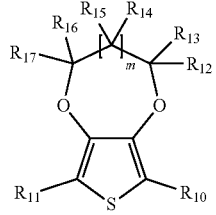

In Formula 4, $R_{10}$ and $R_{11}$ are the same as $R_1$ and $R_2$ of Formula 1 when the structure of Formula 4 is formed in Formula 1, and are the same as $R_5$ and $R_6$ of Formula 2 when it is formed in Formula 2, and thus they are hydrogen or a halogen atom. In addition, the matters for $R_1$ and $R_2$ of Formula 1 and $R_5$ and $R_6$ of Formula 2 mentioned herein may be equally applied to $R_{10}$ and $R_{11}$ of Formula 4 above.

In Formula 4, m may be a number in a range of 0 to 20, and may be, for example, 0 to 18, 0 to 16, 0 to 14, 0 to 12, 0 to 10, 0 to 8, 0 to 6 or 0 to 4, or may be 0 to 2 or 0 or 1.

In Formula 4, $R_{12}$ to $R_{17}$ may each independently be hydrogen or the flowable functional group when the structure of Formula 4 is formed in Formula 1. In this case, the detailed description of the flowable functional group is as described above, and in one example, the flowable functional group may exist in the range that can satisfy the ratio of the flowable functional group described above.

In Formula 4, $R_{12}$ to $R_{17}$ may each independently be hydrogen, a hydroxy group, a carboxyl group, an amino group, an azide group, an alkyl group, a hydroxyalkyl group, a carboxylalkyl group, an arylalkyloxycarbonyl group, an arylalkyloxycarbonylalkyl group, an alkylsilyloxycarbonyl group or an alkylsilyloxycarbonylalkyl group when the structure of Formula 4 above is formed in Formula 2. In consideration of the packing efficiency between the formed polymers and the like, in the structure of Formula 4 formed in Formula 2 above, $R_{12}$ to $R_{17}$ may each independently be hydrogen, a hydroxy group, a carboxyl group, an amino group, an azide group, a methyl group, an ethyl group, a hydroxymethyl group, a hydroxyethyl group, a carboxymethyl group or a carboxyethyl group, and more suitably, may each independently be hydrogen, an amino group, an azide group, a methyl group, an ethyl group or a hydroxymethyl group.

In the present application, when the monomer mixture comprises a compound of Formula 1 (and/or a compound of Formula 4 derived therefrom) and a compound of Formula 2 (and/or a compound of Formula 4 derived therefrom) at the same time, they do not have the same structure.

On the other hand, in the monomer mixture, a halogen atom which may be included in at least one of $R_1$ and $R_2$ of Formula 1 and $R_5$ and $R_6$ of Formula 2 serves to induce initiation of the polymerization reaction and/or a chain polymerization reaction.

When light is irradiated, the bond of the halogen atom included in at least one of $R_1$ and $R_2$ of Formula 1 and $R_5$ and $R_6$ of Formula 2 and the carbon atom is cleaved to generate a radical, whereby the chain polymerization can occur. The compound of Formula 1 or 2 having a halogen atom may be an initiator of a polymerization reaction or part of a growing polymer chain.

Such a halogen atom may be exemplified by fluorine, chlorine, bromine or iodine, and the like, and suitably, may be iodine.

In one example, when the second monomer comprises the compound of Formula 2 above, the ratio (Halo/(Halo+H)) of the molar number (Halo) of all halogen atoms included in $R_1$ and $R_2$ of Formula 1 above and $R_5$ and $R_6$ of Formula 2 above and the molar number (H) of the hydrogen atoms included in $R_1$ and $R_2$ of Formula 1 above and $R_5$ and $R_6$ of Formula 2 above may be in a range of 0.001 to 99.

In another example, the ratio (Halo/(Halo+H)) may be 0.01 or more, 0.05 or more, 0.1 or more, 0.5 or more, 1 or more, 5 or more, 10 or more, 15 or more, 20 or more, 25 or more, 30 or more, 35 or more, 40 or more, 45 or more, 50 or more, 55 or more, 60 or more, 65 or more, 70 or more, 75 or more, 80 or more, 85 or more, 90 or more, or 95 or more, or may also be 95 or less, 90 or less, 85 or less, 80 or less, 75 or less, 70 or less, 65 or less, 60 or less, 55 or less, 50 or less, 45 or less, 40 or less, 35 or less, 30 or less, 25 or less, 20 or less, 15 or less, 10 or less, 5 or less, 1 or less, 0.5 or less, 0.1 or less, or 0.05 or less or so.

When the second monomer does not comprise the compound of Formula 2 above, both $R_1$ and $R_2$ of Formula 1 may be halogen atoms.

When the monomer mixture comprises both the compounds of Formulas 1 and 2 above, $R_1$ and $R_2$ of Formula 1 may be halogen atoms and $R_5$ and $R_6$ of Formula 2 may be hydrogen atoms, or $R_1$ and $R_2$ may be hydrogen atoms and $R_5$ and $R_6$ may be halogen atoms.

By satisfying such conditions, only photo-arylation exists, or it is advantageous to induce a polymerization reaction in which the photo-arylation predominates in a chain reaction.

The monomer mixture applied in the polymerization of the present application may comprise only the first and second monomers, or may further comprise other monomers in addition to the first and second monomers, if necessary.

The ratio of the first and second monomers in the monomer mixture is also determined according to the purpose, which is not particularly limited, but in consideration of polymerization efficiency and the like, 0.01 to 30 mol of the second monomer per mol of the first monomer may be included in the monomer mixture. In another example, the ratio of the second monomer may be 0.05 mol or more, 0.1 mol or more, 0.5 mol or more, or 0.9 mol or more, or may also be 28 mol or less, 26 mol or less, 24 mol or less, 22 mol or less, 20 mol or less, 18 mol or less, 16 mol or less, 14 mol or less, 12 mol or less, 10 mol or less, 8 mol or less, 6 mol or less, or 4 mol or less or so.

The polymerization of such a monomer mixture may be performed in the presence of a solvent, or may be performed by solid phase polymerization. The solid phase polymerization means a case where the polymerization of the monomer mixture is performed in the substantial absence of a solvent. The substantial absence of a solvent may mean a case where the ratio of the solvent in the monomer mixture to be polymerized or the composition comprising the same is about 1 weight % or less, 0.5 weight % or less, 0.1 weight % or less, 0.05 weight % or less, 0.01 weight % or less, 0.005 weight % or less, 0.001 weight % or less, 0.0005 weight % or less, 0.0001 weight % or less, 0.00005 weight % or less, or 0.00001 weight % or less or so. In addition, the lower limit of the ratio of the solvent is 0 weight %.

In the case of the present application, the efficient polymerization can be allowed even under the conditions where the solvent is not substantially present by the presence of the compound of Formula 1 of the first monomer capable of imparting mobility, which can greatly extend the use of the method of the present application.

The polymerization may also be performed in the presence of a solvent. In this case, as the solvent, a solvent that contains no hydrogen atom may be applied.

The solvents containing a hydrogen atom absorb halogen radicals and/or halogen molecules generated in the polymerization process. When such halogen radicals and/or halogen molecules generated in the polymerization process are absorbed and exhausted by the solvent, it is difficult to generate radicals with activity, and thus no reaction between a monomer or a macromolecule produced by the polymerization and other monomers is additionally performed, so that the desired high molecular weight product cannot be obtained. When a solvent is applied, by applying a solvent containing no hydrogen atom as the solvent, it is possible to prevent the exhaustion of halogen radicals and/or halogen molecules.

When the solvent is present, the ratio of the monomer is not particularly limited, and the thiophene-based monomer may be applied at an appropriate ratio in consideration of the desired polymer. In one example, the first and second monomers may have a concentration in a range of about 0.01 mol/L to 1 mol/L. The concentration of the first and second monomers may be the concentration of the monomer in the solvent. In another example, the concentration may be about 0.05 mol/L or more, 0.1 mol/L or more, 0.15 mol/L or more, 0.2 mol/L or more, 0.25 mol/L or more, 0.3 mol/L or more, 0.35 mol/L or more, 0.4 mol/L or more, 0.45 mol/L or more, or 0.5 mol/L or more. In this range, the effective polymerization of the monomers can be induced.

As described above, it is possible to prevent consumption of halogen radicals and halogen molecules by not applying a solvent having a hydrogen atom. Therefore, even when the polymerization is performed in a solvent, only the solvent having no hydrogen atom may be included as the solvent, and may not substantially comprise the solvent having a hydrogen atom. Here, the fact that does not substantially apply the solvent having a hydrogen atom may mean the case where the ratio of the solvent having a hydrogen atom in the monomer mixture or the composition comprising the same is about 1 weight % or less, 0.5 weight % or less, 0.1 weight % or less, 0.05 weight % or less, 0.01 weight % or less, 0.005 weight % or less, 0.001 weight % or less, 0.0005 weight % or less, 0.0001 weight % or less, 0.00005 weight % or less, or 0.00001 weight % or less or so. In addition, the lower limit of the ratio of the solvent is 0 weight %.

As the solvent without any hydrogen atom, various solvent can be applied without any particular limitation as long as it contains no hydrogen atom. Such a solvent can be exemplified by bromotrichloromethane ($CBrCl_3$), tetrachloromethane ($CCl_4$) or dibromodichloromethane ($CBr_2Cl_2$), and the like, but is not limited thereto. In the preparation method of the present application, any one of the above solvents may be selected, and if necessary, a mixed solvent of two or more may also be applied.

In the preparation method of the present application, the polymerization proceeds by irradiating the monomer mixture with light. In this case, the wavelength of the irradiated light is determined in consideration of the absorption efficiency of the monomer mixture or the oligomer formed by polymerization, and the like, and the specific range thereof is not particularly limited. For example, the wavelength of the irradiated light may be in a range of about 100 to 400 nm.

In another example, the wavelength of the irradiated light may be 150 nm or more, 200 nm or more, or about 220 nm or more, or may also be 380 nm or less, 375 nm or less, 370 nm or less, 350 nm or less, 300 nm or less, or 250 nm or less or so.

In addition, the total energy by the light irradiated in the irradiation process may be in a range of about 0.01 W/cm$^2$ to 20 W/cm$^2$ or so. If the total energy is too small, radical formation does not occur efficiently, whereas if the total energy is too high, photodegradation may occur in a product or the like, so that it can be adjusted to an appropriate range in consideration of this.

In some aspects of the present application, the light irradiation may be performed in two steps. For example, the light irradiation step may comprise a first step of irradiating it with light having a wavelength in a range of 100 to 400 nm; and a second step of irradiating it with light having a wavelength higher than the wavelength of the light irradiated in the step.

Here, the wavelength of the light irradiated in the second step is not limited, but may be, for example, 450 nm or more.

The first and second steps may be performed continuously without interruption, or after performing the first step and stopping the light irradiation for a predetermined time, the second step of irradiating it with light having a wavelength of 450 nm or more may be performed at an appropriate time point. In addition, while the second step is performed, only the light having a wavelength of 450 nm or more may be irradiated, or the light having a wavelength of 450 nm or less may also be irradiated together with the light.

In another example, the wavelength of the light irradiated in the second step may be about 900 nm or less, 850 nm or less, 800 nm or less, 750 nm or less, 700 nm or less, 650 nm or less, 600 nm or less, or 550 nm or less, or may also be 460 nm or more, 480 nm or more, or 500 nm or more or so.

For generating radicals in the polymerization process of the present application and forming the desired polymer through a chain reaction by the radicals, it is required that the irradiated light is absorbed by a monomer or a macromolecule formed by polymerization of the monomer to generate radicals in a chain reaction. However, the wavelength of the light that the monomer efficiently absorbs and the wavelength of the light that the macromolecule formed by polymerizing the monomers absorbs are different from each other, and thus if the light of the same wavelength is continuously irradiated in the polymerization process, at least one radical generation efficiency is lowered, so that it is not easy to produce a polymer having a desired molecular weight. Therefore, in consideration of the molecular weight of the desired level, if necessary, the desired polymer can be generated by performing the first step for an appropriate time and then changing the wavelength of the irradiated light or further irradiating it with another light to perform the second step.

In the second step, the total energy by the irradiated light may be adjusted to a level similar to the above-mentioned range. If the total energy is too small, radical formation does not occur efficiently, whereas if it is too high, photodegradation may occur in a product or the like, so that it can be adjusted to an appropriate range in consideration of this. On the other hand, when the light irradiated in the second step is pulsed light to be described below, the total energy is average energy.

The light irradiation performed in the second step may proceed using a pulsed light source, for example, a pulsed laser light source. When light having such a long wavelength is subjected to pulse irradiation, the polymerization can be stably performed while effectively preventing photodegradation by the irradiated light. In this case, the frequency of the pulsed light source may be adjusted in a range of about 1 to 20 Hz or so. In another example, the frequency may be about 2 Hz or more, 3 Hz or more, 4 Hz or more, 5 Hz or more, 6 Hz or more, 7 Hz or more, 8 Hz or more, 9 Hz or more, or 10 Hz or more, or may also be about 19 Hz or less, 18 Hz or less, 17 Hz or less, 16 Hz or less, 15 Hz or less, 14 Hz or less, 13 Hz or less, 12 Hz or less, 11 Hz or less, or 10 Hz or less or so.

According to one example, when the first and second steps are performed together, a step of additionally supplying a halogen source at an appropriate time (for example, between the first step and the second step) may further be performed.

While this step maintains or improves the radical generation efficiency, the polymerization process can be performed more effectively. As the halogen source, a known compound may be applied without particular limitation, which may be exemplified by, for example, fluorine molecules ($F_2$), chlorine molecules ($Cl_2$), bromine molecules ($Br_2$) or iodine molecules ($I_2$), and the like, and may be, suitably, iodine molecules ($I_2$). The supply of halogen can also be performed more smoothly by adding perchloric acid ($HClO_4$) and the like together with the halogen molecules.

Although the temperature at which the method for preparing a polymer of the present application is performed is not particularly limited, if necessary, for example, when the solid phase polymerization is performed, it may be adjusted to a certain level. That is, in the case of the solid phase polymerization, no solvent is present, and thus the mobility of the monomers is more important, whereby in consideration of this, the mobility of the monomer can be further improved by adjusting the temperature.

For example, the polymerization, that is, the light irradiation may be performed at a temperature of about 30° C. to 100° C. In another example, the polymerization temperature may be about 35° C. or higher, 40° C. or higher, or 45° C. or higher, or may also be 95° C. or lower, 90° C. or lower, 85° C. or lower, 80° C. or lower, 75° C. or lower, 70° C. or lower, 65° C. or lower, 60° C. or lower, 55° C. or lower, or 50° C. or lower or so. This polymerization temperature may be adjusted in consideration of the mobility of the monomer mixture.

The method for preparing a polymer of the present application described above may further perform any necessary processes. Such a process includes, for example, washing or purification of the formed polymer or doping of the polymer, and the like, and the method of performing such a process follows a known method.

Such a method for preparing a polymer of the present application may be applied to various applications, and one example thereof is a method for preparing a conductive polymer film which forms an electrode pattern or the like.

Therefore, another aspect of the present application is a preparation method of the said conductive polymer film or the electrode pattern. This method can be basically performed according to the method for preparing the polymer.

For example, the method may comprise a step of irradiating a coating layer comprising a monomer mixture including a first monomer containing a compound of Formula 1 above; and a second monomer containing a compound of Formula 2 above and/or a condensed cyclic compound with light and polymerizing it. Here, the preparation of the conductive film can be basically performed in the same manner as the preparation method of the polymer already described above, except for irradiating the coating layer with light, and thus unless otherwise stated, all the descriptions of the method for preparing a polymer as described above can be equally applied to the method for preparing a conductive polymer film. On the other hand, in this specification, the term conductive polymer means a film having a conductivity of about 100 S/cm or more as measured by a four-point-probe method. As the conductivity has a higher value, it is more appropriate, which is not particularly limited, but in another example, it may be about 150 S/cm or more, 200 S/cm or more, 250 S/cm or more, 300 S/cm or more, 350 S/cm or more, 400 S/cm or more, 450 S/cm or more, 500 S/cm or more, 550 S/cm or more, 600 S/cm or more, 650 S/cm or more, 700 S/cm or more, 750 S/cm or more, or 800 S/cm or more or so, where the upper limit is about 1,000 S/cm or so, but is not limited thereto.

In the method of the present application, the conductive polymer film may be formed to have excellent transparency. Therefore, the preparation method of the conductive polymer film may be a method for manufacturing a transparent electrode. Here, the fact that the conductive polymer film is transparent is a case where it has average transmittance for the visible light (380 to 780 nm) of about 50% or more, 55% or more, 60% or more, 65% or more, 70% or more, 75% or more, 80% or more, 85% or more, or 90% or more, as measured by UV-vis spectrometer, and the upper limit is not limited, which may be 100% or so.

The formation method of the coating layer applied to the preparation method of the conductive polymer film is not specifically limited. For example, the coating layer may be formed by coating a coating liquid comprising the first monomer; the second monomer and a solvent. Although the kind of the solvent applied in such a case is not particularly limited, the solvent containing no hydrogen atom can be applied when the polymerization proceeds in the presence of a solvent. A known method can also be applied to the coating method for forming the coating layer, and if necessary, in consideration of the desired electrode pattern or the like, the coating may proceed by pattern coating. In addition, if the solid phase polymerization is intended, the step of removing the solvent after the coating may be further performed. This step can be performed in a manner that maintains the coating layer at an appropriate temperature, in consideration of the applied solvent.

The present application also relates to a polymer prepared in the above manner or a conductive polymer film (or electrode) comprising the polymer. The conductive polymer film or electrode may exhibit the aforementioned conductivity and/or transparency.

The polymer is formed by the preparation method, which may comprise, for example, a polymerized unit of Formula 5 below formed by the compound of Formula 1 above, and may further comprise a polymerized unit of Formula 6 below formed by the compound of Formula 2 above and/or a polymerized unit of the condensed cyclic compound formed by the condensed cyclic compound.

The polymerization unit formed by the compound of Formula 1 above may be a polymerized unit represented by Formula 5 below.

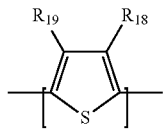

[Formula 5]

In Formula 5, $R_{18}$ and $R_{19}$ correspond to $R_3$ and $R_4$ of Formula 1 above, which may each independently be hydrogen or a flowable functional group, or may be linked to each other to form an alkylenedioxy group substituted with the flowable functional group, and specific matters thereof are the same as those described for $R_3$ and $R_4$ of Formula 1 above.

The polymerized unit formed by the compound of Formula 2 above may be a polymerized unit represented by Formula 6 below.

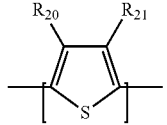

[Formula 6]

In Formula 6, $R_{20}$ and $R_{21}$ may correspond to $R_7$ and $R_8$ of Formula 2 above, which may each independently hydrogen, a hydroxy group, a carboxyl group, an amino group, an azide group, an alkyl group, a hydroxyalkyl group, a carboxylalkyl group, an arylalkyloxycarbonyl group, an arylalkyloxycarbonylalkyl group, an alkylsilyloxycarbonyl group or an alkylsilyloxycarbonylalkyl group, or may be linked to each other to form a substituted or unsubstituted alkylenedioxy group, ether bond-containing group or ester bond-containing group, and specific matters thereof are the same as those described for $R_7$ and $R_8$ of Formula 2 above.

As mentioned above, the polymerized unit of Formula 5 above and the polymerized unit of Formula 6 above also do not have the same structure, as Formulas 1 and 2 do not have the same structure.

In one example, when the polymerized unit is formed by a compound of Formula 1 and/or 2 including an alkylenedioxy group, each polymerized unit may be represented by Formula 7 below.

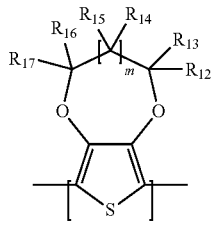

[Formula 7]

In Formula 7, m may be a number in a range of 0 to 20, and may be, for example, 0 to 18, 0 to 16, 0 to 14, 0 to 12, 0 to 10, 0 to 8, 0 to 6, 0 to 4, or may be 0 to 2 or 0 or 1.

In Formula 7, $R_{12}$ to $R_{17}$ are the same as those mentioned in Formula 4 above, and thus, when the structure of Formula 7 is formed from Formula 1 above, they may each independently be hydrogen or the flowable functional group. In this case, the specific description of the flowable functional group is as described above.

In Formula 7, when the structure of Formula 7 above is formed from Formula 2, $R_{12}$ to $R_{17}$ may each independently be hydrogen, a hydroxy group, a carboxyl group, an amino group, an azide group, an alkyl group, a hydroxyalkyl group, a carboxylalkyl group, an arylalkyloxycarbonyl group, an arylalkyloxycarbonylalkyl group, an alkylsilyloxycarbonyl group or an alkylsilyloxycarbonylalkyl group. Considering the packing efficiency between the formed polymers, $R_{12}$ to $R_{17}$ in the structure of Formula 7 formed from Formula 2 above may each independently be hydrogen, a hydroxy group, a carboxyl group, an amino group, an azide group, a methyl group, an ethyl group, a hydroxymethyl group, a hydroxyethyl group, a carboxymethyl group or a carboxyethyl group, and more suitably, may each independently be hydrogen, an amino group, an azide group, a methyl group, an ethyl group or a hydroxymethyl group.

The polymerized unit formed from the condensed cyclic compound may have a known structure formed by each monomer.

For example, the polymerized unit formed by 9H-fluorene in the fluorine-based monomers may be represented by Formula 8 below, and the polymerized unit formed by 4H-cyclopenta[1,2-b:5,4-b]bisthiophene in cyclopentabisthiphene-based monomers may be represented by Formula 9 below.

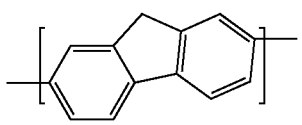
[Formula 8]

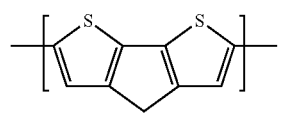
[Formula 9]

The ratio of each polymerized unit in the polymer can be determined according to the ratio between the first and second monomers as mentioned above.

For example, when the polymer comprises the polymerized unit of Formula 6 above together with the polymerized unit of Formula 5 above, each polymerized unit may be included in the ratio that the molar ratio (=100×molar number of flowable functional group/(total molar number of $R_{18}$, $R_{19}$, $R_{20}$ and $R_{21}$)) of the flowable functional group to the total molar number of $R_{18}$ to $R_{21}$ is in a range of 1 mol % to 100 mol %.

In another example, the molar ratio may be 3 mol % or more, 5 mol % or more, 7 mol % or more, 10 mol % or more, 15 mol % or more, 20 mol % or more, 25 mol % or more, 30 mol % or more, 35 mol % or more, 40 mol % or more, 45 mol % or more, 50 mol % or more, 55 mol % or more, 60 mol % or more, 65 mol % or more, or may be 95 mol % or less, 90 mol % or less, 85 mol % or less, 80 mol % or less, 75 mol % or less, 70 mol % or less, 65 mol % or less, 60 mol % or less, 55 mol % or less, 50 mol % or less, 45 mol % or less, 40 mol % or less, 35 mol % or less, 30 mol % or less, 25 mol % or less, 20 mol % or more, or 15 mol % or more.

In the polymer, each polymerized unit may be present so that the molar number of the polymerized unit formed by the second monomer (for example, the total molar number of the polymerized unit of Formula 6 above and the polymerized unit of the condensed cyclic compound) is in the range of 0.01 to 30 mol per mol of the polymerized unit formed by the first monomer, for example, the polymerized unit of Formula 5 above. In another example, the molar number of the polymerized unit formed by the second monomer may be 0.05 mol or more, 0.1 mol or more, 0.5 mol or more, or 0.9 mol or more, or may also be 28 mol or less, 26 mol or less, 24 mol or less, 22 mol or less, 20 mol or less, 18 mol or less, 16 mol or less, 14 mol or less, 12 mol or less, 10 mol or less, 8 mol or less, 6 mol or less, or 4 mol or less or so.

The polymer is prepared by the method of the present application described above, which may have a large molecular weight.

The polymer is prepared by the above-described method, where the catalyst is not substantially applied in the preparation process, so that it may be substantially free of a catalyst component. The catalyst component is usually a catalyst component applied to the production of a conductive polymer such as polythiophene, which is, specifically, an oxidant used in an oxidation reaction, and $FeCl_3$, $MnO_2$, $CuCl_2$, Fe(tosylate), $Na_2S_2O_8$ or the like, or a transition metal ligand catalyst such as 1,3-bis(diphenylphosphino)propane]dichloronickel (II), and the like can be exemplified.

Since the polymer is substantially free of the catalyst component, the ratio of the catalyst component in the polymer may be about 1 weight % or less, 0.5 weight % or less, 0.1 weight % or less, 0.05 weight % or less, 0.01 weight % or less, 0.005 weight % or less, 0.001 weight % or less, 0.0005 weight % or less, 0.0001 weight % or less, 0.00005 weight % or less, or 0.00001 weight % or less or so. The lower limit of the ratio of the catalyst component is 0 weight %.

The polymer of the present application as above may be applied to various applications, and for example, the conductive polymer film or the electrode film formed in the manner described above is included.

Therefore, the present application also relates to a conductive polymer film comprising the polymer.

Such a conductive polymer film may have an excellent conductivity as described above, for example, a conductivity of about 100 S/cm or more, about 150 S/cm or more, 200 S/cm or more, 250 S/cm or more, 300 S/cm or more, 350 S/cm or more, 400 S/cm or more, 450 S/cm or more, 500 S/cm or more, 550 S/cm or more, 600 S/cm or more, 650 S/cm or more, 700 S/cm or more, 750 S/cm or more, or 800 S/cm or more, as measured by a four-point-probe method, and the upper limit may be about 1,000 S/cm or so, but is not limited thereto.

The conductive polymer film may have excellent transparency, and for example, the average transmittance for the visible light (380 to 780 nm) may be about 50% or more, 55% or more, 60% or more, 65% or more, 70% or more, 75% or more, 80% or more, 85% or more, or 90% or more or so, or may be 100% or less or so, as measured by UV-vis spectrometer.

The use of such a polymer of the present application or the conductive polymer film comprising the same is not limited, and it can be efficiently applied to various optical or non-optical displays, and various applications, to which conductive polymers have been conventionally applied, including organic solar cells, OLEDs, LCDs, electrochromic devices, and the like.

The present application can provide a preparation method capable of preparing a desired polymer or conductive polymer film with excellent polymerization efficiency and conversion rates without consumption or modulation in the polymerization process, and a polymer and a conductive polymer film formed by the method. The present application can provide a method for preparing a polymer or a conductive polymer film having a desired level of transparency and conductivity, wherein desired physical properties such as solubility in a solvent or resistance to a solvent are effectively imparted thereto as necessary, and a polymer and a conductive polymer film formed by the method.

EXAMPLES

Hereinafter, the present application will be described in detail by way of Examples, but the scope of the present application is not limited by the following Examples.

1. NMR Analysis Method $^1$H-NMR analysis in Examples and Synthesis Examples was performed at room temperature using an NMR spectrometer including a Bruker UltraShield (300 MHz) spectrometer with a triple resonance 5 mm probe. An analyte was diluted to a concentration of about 10 mg/ml or so in a solvent for NMR measurement (CDCl$_3$) and used, and chemical shifts were expressed in ppm.

2. UV-Vis Spectrum Analysis

After chloroform was placed in a transparent quartz cuvette (45 mm×12.5 mm×12.5 mm) and calibrated in a wavelength region of 200 nm to 1000 nm, UV-vis spectra were performed using Agilent Technologies' Cary 50 UV-Vis spectrophotometer instrument (manufacturer: Agilent Technologies, product name: Cary 50) by a method of measuring absorbance of a sample in which the polymerized sample was diluted with chloroform for the wavelength region.

3. Conductivity Evaluation

The conductivity was calculated from the film thickness confirmed by ellipsometry and sheet resistivity measured by a four-point probe method and obtained.

Synthesis Example 1

Compound 1 (2,5-diiodo-[3,4-(3,3'-dibutylpropylenedioxy)]thiophene) in Scheme 1 below was synthesized in the following manner.

[Scheme 1]

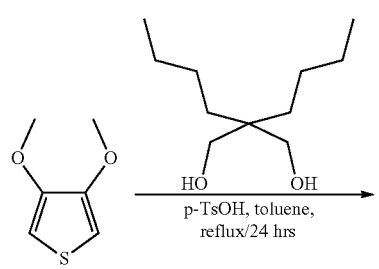

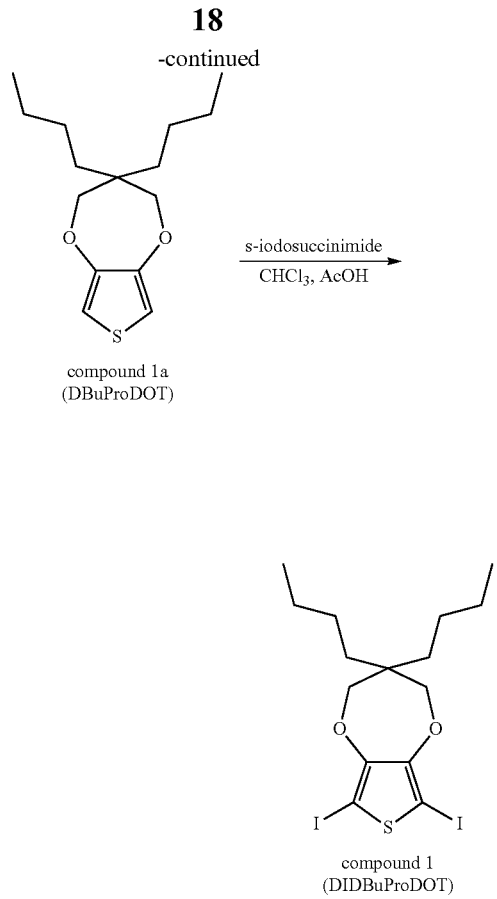

6 g (41.61 mmol, 1 eq) of 3,4-dimethoxythiophene and 10.187 g (54.10 mmol, 1.3 eq) of 2,2-dibutyl-1,3-propanediol were dissolved, together with 500 mg of p-toluenesulfonic acid, in 200 mL of toluene. The mixture was refluxed at 120° C. and the methanol produced by a reaction (transetherification) of the reactant was removed by a 4A type molecular sieve filled with a soxhlet extractor. After reflux for 24 hours, the mixture was quenched with water, extracted with ethyl acetate and then washed with brine, and the reactant was dried over MgSO$_4$. The solvent was evaporated by a rotary evaporator and the residue was purified by column chromatography eluting with methylene chloride/hexane (1:4) to obtain a target (Compound 1a in Scheme 1). FIG. 1 is a $^1$H-NMR measurement result of the target.

5 g (18.63 mmol, 1 eq) of Compound 1a was dissolved in chloroform and stirred together with 9.22 g (40.98 mmol, 1 eq) of n-iodosuccinimide and a few drops of acetic acid. The mixture was quenched with deionized water, washed with sodium thiosulfate to remove excess iodine, and then dried over MgSO$_4$ and evaporated under vacuum. The residue was purified by column chromatography eluting with methylene chloride/hexane (1:8) to obtain a target (Compound 1). FIG. 2 is a $^1$H-NMR spectrum measurement result of the target.

Synthesis Example 2

Compound 2 (3,4-(3-methylpropylenedioxy)thiophene) in Scheme 2 below was synthesized in the following manner.

[Scheme 2]

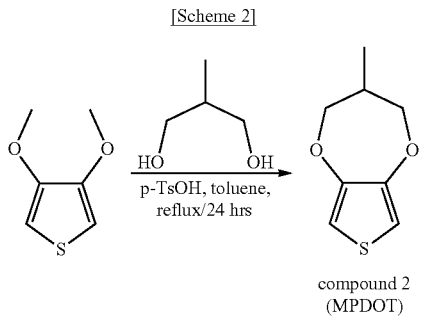

compound 2
(MPDOT)

5 g (34.68 mmol, 1 eq) of 3,4-dimethoxythiophene and 3.75 g (41.61 mmol, 1.2 eq) of 2-methyl-1,3-propanediol were dissolved, together with 500 mg of p-toluenesulfonic acid, in 200 ml of toluene. The solution was refluxed at 120° C. and the methanol produced by a reaction (transetherification) of the reactant was removed by a 4A type molecular sieve filled in a soxhlet extractor. After reflux for 25 hours, the mixture was quenched with water, extracted with ethyl acetate and then washed with brine, and dried over $MgSO_4$. The solvent was evaporated by an evaporator (rotary evaporator) and the residue was purified by column chromatography eluting with methylene chloride/hexane (1/4) to obtain a target (Compound 2). FIG. 3 is a $^1$H-NMR spectrum of the target.

Synthesis Example 3

Compound 3 (3,4-(3,3'-dimethylpropylenedioxy)thiophene) in Scheme 3 below was synthesized in the following manner.

[Scheme 3]

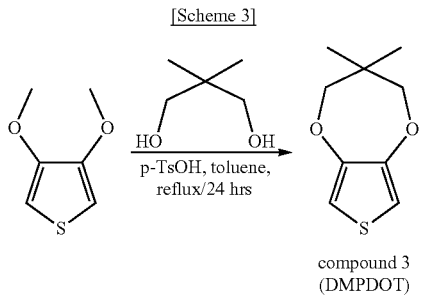

compound 3
(DMPDOT)

5 g (34.68 mmol, 1 eq) of 3,4-dimethoxythiophene and 4.72 g (41.61 mmol, 1.2 eq) of 2,2-dimethyl-1,3-propanediol were dissolved, together with 500 mg of p-toluenesulfonic acid (p-toluenesulfonic acid), in 200 ml of toluene. The solution was refluxed at 120° C. and the methanol produced by a reaction (transetherification) was removed with a 4A type molecular sieve filled in a soxhlet extractor. After reflux for 24 hours, the mixture was quenched with water, extracted with ethyl acetate and then washed with brine, and dried over $MgSO_4$. The solvent was evaporated by an evaporator (rotary evaporator) and the residue was purified by column chromatography eluting with methylene chloride/hexane (1/4) to obtain a target (Compound 3). FIG. 4 is a $^1$H-NMR spectrum of the target.

Synthesis Example 4

Compound 6 (3,4-[2,2'-bis(hydroxymethyl)propylenedioxy]thiophene) in Scheme 4 below was synthesized in the following manner.

[Scheme 4]

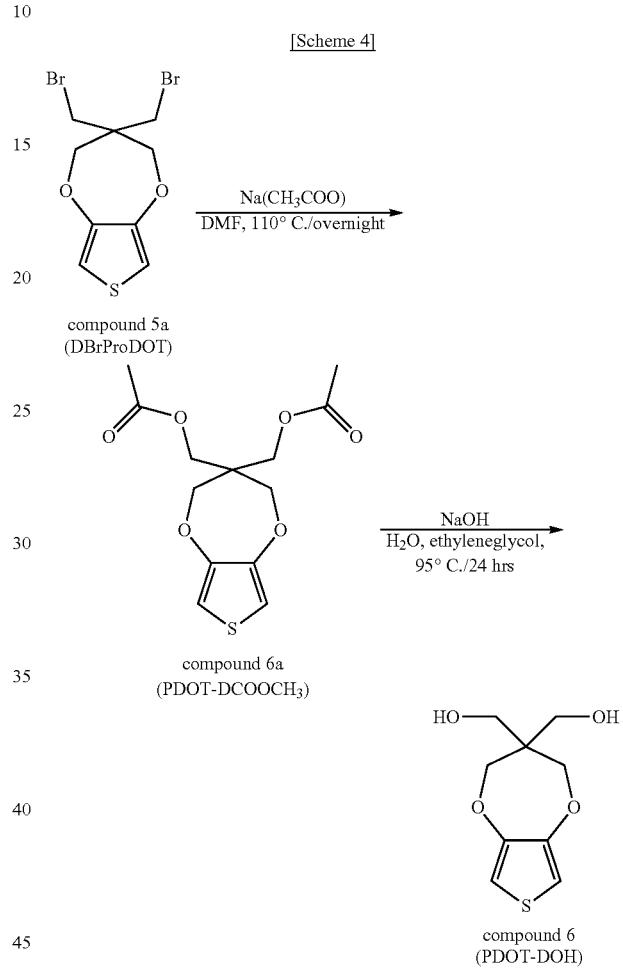

compound 5a
(DBrProDOT)

compound 6a
(PDOT-DCOOCH$_3$)

compound 6
(PDOT-DOH)

5 g (14.62 mmol, 1 eq) of 3,4-(2,2'-bis(bromomethyl) propylenedioxy)thiophene (compound 5a) and 12 g (0.146 mol, 10 eq) of sodium acetate were dissolved in DMF (N,N-dimethylformamide) and refluxed at 110° C. overnight. After cooling to room temperature, the solution was quenched with water, extracted three times with ethyl acetate and then washed with brine, dried over $MgSO_4$ and then evaporated in vacuo. The residue was purified by column chromatography eluting with ethyl acetate/hexane (1/2) to obtain a target (compound 6a). FIG. 5 is a $^1$H-NMR spectrum of the target.

3 g (9.99 mmol, 1 eq) of compound 6a was dissolved in 15 mL of an NaOH aqueous solution (2M) and 15 mL of acetonitrile, and stirred at room temperature overnight. The solution was diluted with 2N $H_2SO_4$, extracted with ethyl acetate and then washed with brine. The residue was dried with $MgSO_4$ and then purified by chloroform precipitation to obtain a target (compound 6). FIG. 6 is a $^1$H-NMR spectrum of the target.

Synthesis Example 5

Compound 8 (3,4-[2,2'-bis(2-nitro-5-(dodecyloxy)benzylcarboxylic)propylenedioxy]thiophene) in Scheme 5 below was synthesized in the following manner.

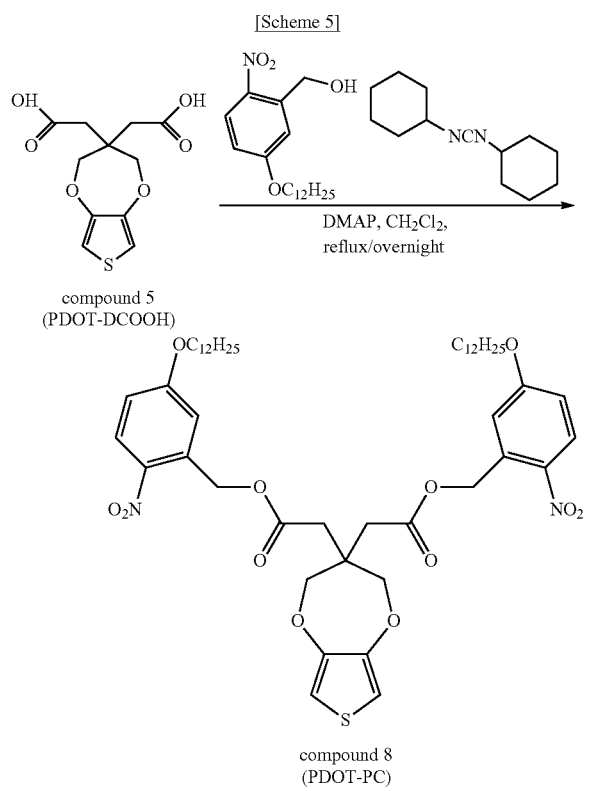

compound 5
(PDOT-DCOOH)

compound 8
(PDOT-PC)

5 g (1 eq) of 3,4-(2,2'-bis(bromomethyl)propylenedioxy)thiophene (compound 5a of Synthesis Example 4) and 21.5 g (25.61 mmol, 1.2 eq) of sodium cyanide were dissolved in 150 mL of DMSO (dimethyl sulfoxide) and stirred at room temperature for 10 days. The mixture was quenched with water, extracted with methylene chloride and then washed with brine, and dried over $MgSO_4$. The solvent was evaporated with a rotary evaporator, and then the residue was purified by column chromatography eluting with methylene chloride/hexane (2/1) to obtain 3,4-(2,2'-bis(cyanomethyl)propylenedioxy)thiophene.

2 g (8.54 mmol, 1 eq) of 3,4-(2,2'-bis(cyanomethyl)propylenedioxy)thiophene was dissolved in 100 mL of an NaOH aqueous solution (2M) and 100 mL of ethylene glycol. The solution was refluxed at 95° C., cooled to room temperature after 24 hours, and then a hydrochloric acid aqueous solution (1N) was added. The quenched solution was extracted three times with diethyl ether, washed with brine and then dried over $MgSO_4$ and evaporated in vacuo. The residue was precipitated in chloroform to obtain a target (compound 5, 3,4-(2,2'-bis(carboxymethyl)propylenedioxy)thiophene) in a crystalline form.

1 g (3.67 mmol, 1 eq) of Compound 5, 2.73 g (8.08 mmol, 2.2 eq) of 2-nitro-5-(dodecyloxy)phenylmethanol and 2.27 g (8.08 mmol, 2.2 eq) of DMPA (4-dimethylaminopyridine) were dissolved in anhydrous methylene chloride under argon purging. 1.67 g (8.08 mmol, 2.2 eq) of N,N'-dicyclohexylcarbodiimide dissolved in 15 mL of anhydrous methylene chloride was added to the solution. The mixture was refluxed overnight and cooled to room temperature. The solution was quenched with $NaHCO_3$ and HCL 1N, and then the organic layer was dried with $MgSO_4$ and then evaporated in vacuo. The residue was purified by column chromatography on silica using methylene chloride/hexanes (1/2) to obtain a target (compound 8). FIG. 7 is a $^1$H-NMR spectrum of the target.

Synthesis Example 6

Compound 9a ([(2-(2-(2-methoxyethoxy)ethoxy)methyl)ethylenedioxy]thiophene) and Compound 9 (2,5-diiodo-[3,4-(2-(2-(2-methoxyethoxy)ethoxy)methyl)ethylenedioxy]thiophene) were synthesized in the following manner.

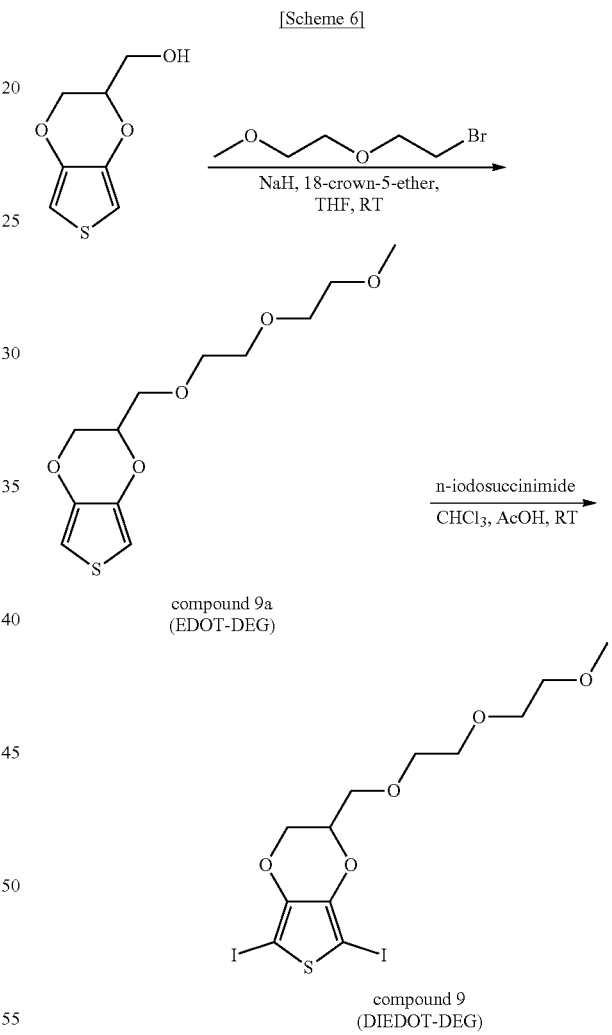

compound 9a
(EDOT-DEG)

compound 9
(DIEDOT-DEG)

0.581 g (14.52 mmol, 5.0 eq) of NaH (60% with oil) and 76.8 mg (0.29 mmol, 0.1 eq) of 18-crown-6-ether were mixed and stirred in 15 mL of THF (Tetrahydrofuran) under argon purging. To the solution cooled with ice water, 0.5 g (2.90 mmol, 1 eq) of hydroxymethyl EDOT (3,4-ethylenedioxythiophene) was added and stirred at room temperature for 1 hour. The solution was cooled to 0° C. with ice and 0.47 mL (3.48 mmol, 1.2 eq) of 1-bromo-2-(2-methoxyethoxy)ethane was added in drops. The solution was refluxed at 80° C. for 24 hours, cooled to room temperature, and then quenched by adding 1N HCl in drops and then extracted three times with diethyl ether. The organic layer was washed with 1N HCl and brine, dried with $MgSO_4$ and then evaporated in vacuo. The residue was purified by column chromatography to obtain a target (compound 9a). FIG. 8 is a $^1$H-NMR spectrum of the target.

300 mg (1.09 mmol, 1 eq) of compound 9a was dissolved in chloroform, and a few drops of acetic acid were added and stirred with excess n-iodosuccinimide. The mixture was quenched with deionized water and washed with sodium thiosulfate to remove excess iodine. The mixture was then dried over $MgSO_4$ and evaporated in vacuo. The residue was eluted with methylene chloride/hexane (1/8) and purified to obtain a target (compound 9). FIG. 9 is a $^1$H-NMR spectrum of the target.

Example 1

Compound 1 of Synthesis Example 1 and Compound 3 of Synthesis Example 3 were polymerized to form a conductive polymer film. First, the monomers were dissolved in chloroform to prepare a 2 weight % solution. The solution was spin-coated on a glass substrate (1 inch×1 inch), which was cleaned by ultrasonication in dilute soap, acetone and isopropanol and surface-treated with ozone, and dried at 80° C. for 10 minutes to remove the solvent. Subsequently, the coating layer was irradiated with ultraviolet rays (254 nm UV lamp, 4 W or 35 W) in a nitrogen-purged glovebox, and polymerized. The ultraviolet irradiation was performed at 60° C. Thereafter, if necessary, processes of immersing it in methanol for 1 minute or so and then drying it at 80° C., then immersing it in acetone for 1 minute, and then drying it at 80° C., and a doping process were performed. The doping was performed by a method of immersing it in $H_2SO_4$ for 10 minutes or so, washing it with $CHCl_3$ and $CH_3NO_2$, and drying it at 80° C.

FIG. 10 is UV-vis absorption spectra of the polymer films formed by the above method. In FIG. 10, DIDBuP means Compound 1, and DMethylProD means Compound 3. That is, in FIG. 10, 1DIDBuP_2DMethylProD_254(12h) means the result of the polymer film formed by irradiating the monomers comprising Compound 1 and Compound 3 in a molar ratio of 1:2 (Compound 1:Compound 2) with ultraviolet rays having a wavelength of 254 nm for 12 hours; 1DIDBuP_2DMethylProD_254(12h)_CHCl3 means the result of the polymer film that the polymer film formed by irradiating the monomers comprising Compound 1 and Compound 3 in a molar ratio of 1:2 (Compound 1:Compound 2) with ultraviolet rays having a wavelength of 254 nm for 12 hours is cleaned with $CHCl_3$; and 1DIDBuP_2DMethylProD_254(12h)_H2SO4 means the result of the polymer film that the polymer film formed by irradiating the monomers comprising Compound 1 and Compound 3 in a molar ratio of 1:2 (Compound 1:Compound 2) with ultraviolet rays having a wavelength of 254 nm for 12 hours is doped through $H_2SO_4$ treatment.

From FIG. 10, it can be confirmed that the polymer film polymerized after ultraviolet irradiation for 12 hours shows absorption maxima (absorption λmax) at 300 nm and 350 nm, and shows wide absorption in the long wavelength region. The absorption maxima (absorption λmax) at the 300 nm and 350 nm are determined to be due to small oligomer molecules due to coupling between Compound 1. On the other hand, a broad absorption band above 700 nm is believed to be related to the doped conjugated polymer by iodine. After immersing the polymerized polymer film in chloroform and then annealing it at 80° C. to remove low molecules and iodine, the main absorption band shifted to a wavelength of approximately 500 nm, and the absorption band of the low molecules and the absorption band of the long wavelength region disappeared. As the charge transfer by chemical doping occurred, the neutral state was bleached, and at the same time a new absorption band appeared over the longer wavelength visible light region and the near infrared region. The conductivity of the doped polymer film was about 140 S/m or so.

Examples 2 and 3

Compound 1 of Synthesis Example 1 and Compound 2 of Synthesis Example 2 (the molar ratio of Compound 1 and Compound 2 was 1:2 (Compound 1:Compound 2)) were polymerized (Example 2), and Compound 1 of Synthesis Example 1 and Compound 6 of Synthesis Example 4 (the molar ratio of Compound 1 and Compound 6 was 1:2 (Compound 1:Compound 6)) were polymerized (Example 3), in the same manner as in Example 1. The polymer films were formed in the same manner as in Example 1, where the conductivity of the polymer film in Example 2 was 130 S/cm at a thickness of about 160 nm and the conductivity of the polymer film in Example 3 was 270 S/cm at a thickness of about 160 nm.

Examples 4 to 8

Compound 1 of Synthesis Example 1 and EDOT (3,4-Ethylenedioxythiophene) were polymerized in the same manner as in Example 1 with different molar ratios between monomers. FIG. 11 is a view showing absorption spectra according to the above results. In the view, DIDBuP means Compound 1 and EDOT means the EDOT. Accordingly, in FIG. 11, DIDBuP only 254(12h) acetone is the result that the polymer film polymerized by irradiating the monomer containing only Compound 1 with ultraviolet rays having a wavelength of 254 nm for 12 hours is cleaned with acetone; 2DIDBuP_1EDOT_254(12h)_acetone is the result that the polymer film (Example 4) obtained by polymerizing Compound 1 and EDOT in a molar ratio of 2:1 (Compound 1:EDOT) is cleaned with acetone; 1DIDBuP_1EDOT_254 (12h)_acetone is the result that the polymer film (Example 5) obtained by polymerizing Compound 1 and EDOT in a molar ratio of 1:1 (Compound 1:EDOT) is cleaned with acetone; 1DIDBuP_2EDOT_254(12h)_acetone is the result that the polymer film (Example 6) obtained by polymerizing Compound 1 and EDOT in a molar ratio of 1:2 (Compound 1:EDOT) is cleaned with acetone; 1DIDBuP_4EDOT_254 (12h)_acetone is the result that the polymer film (Example 7) obtained by polymerizing Compound 1 and EDOT in a molar ratio of 1:4 (Compound 1:EDOT) is cleaned with acetone; and 1DIDBuP_8EDOT_254(12h)_acetone is the result that the polymer film (Example 8) obtained by polymerizing Compound 1 and EDOT in a molar ratio of 1:8 (Compound 1:EDOT) is cleaned with acetone.

In addition, in FIG. 11, DIDBuP only RT 254(12h)_acetone_H2SO4 is the result that the polymer film polymerized by irradiating the monomer containing only Compound 1 with ultraviolet rays having a wavelength of 254 nm for 12 hours is cleaned with acetone and then doped through $H_2SO_4$ treatment; 2DIDBuP_1EDOT_RT_254 (12h)_acetone_H2SO4 is the result that the polymer film (Example 4) obtained by polymerizing Compound 1 and EDOT in a molar ratio of 2:1 (Compound 1:EDOT) is cleaned with acetone and then doped through $H_2SO_4$ treatment; 1DIDBuP_1EDOT_RT_254(12h)_acetone_H2SO4 is the result that the polymer film (Example 5) obtained by polymerizing Compound 1 and EDOT in a molar ratio of 1:1 (Compound 1:EDOT) is cleaned with acetone and then doped through $H_2SO_4$ treatment; 1DIDBuP_2EDOT_RT_254(12h)_acetone_H2SO4 is the result that the polymer film (Example 6) obtained by polymerizing Compound 1 and EDOT in a molar ratio of 1:2 (Compound 1:EDOT) is cleaned with acetone and then doped through $H_2SO_4$ treatment; 1DIDBuP_4EDOT_RT_254(12h)_acetone_H2SO4 is the result that the polymer film (Example 7) obtained by polymerizing Compound 1 and EDOT in a molar ratio of 1:4 (Compound 1:EDOT) is cleaned with acetone and then doped through $H_2SO_4$ treatment; and 1DIDBuP_8EDOT_RT_254(12h)_acetone_H2SO4 is the result that the polymer film (Example 8) obtained by polymerizing Compound 1 and EDOT in a molar ratio of 1:8 (Compound 1:EDOT) is cleaned with acetone and then doped through $H_2SO_4$ treatment.

From FIG. 11(a), it can be confirmed that the main characteristic absorption band appears near 500 nm, which corresponds to the π-π* transition of the neutral polymer. As the amount of EDOT increased, the absorption maxima red-shifted to longer wavelengths and the extinction coefficients decreased. From this point, it can be seen that EDOT contributes to the formation of the highly packed coplanar conjugated polymer backbone in the polymer film.

The absorption bands associated with the neutral state have been reduced by chemical doping, and new absorption bands appear in the longer wavelength visible light region and the near infrared region. The new absorption band means that the charge transfer by the dopant has occurred (FIG. 11(b)). The doped film was a transparent film having a high charge concentration and exhibiting transmittance of at least 80%.

The conductivity of the polymer film in Example 4 was a level of about 300 to 400 S/cm, the polymer film of Example 5 was a level of about 500 to 600 S/cm, and the conductivity of the polymer films in Examples 6 to 8 was a level of 100 to 200 S/cm.

Examples 9 to 11

Compound 1 of Synthesis Example 1 and Compound 8 of Synthesis Example 5 were polymerized (Example 9), Compound 1 of Synthesis Example 1 and 9H-fluorene were polymerized (Example 10), and Compound 1 of Synthesis Example 1 and a condensed cyclic thiophene compound (4H-cyclopenta[1,2-b:5,4-b]bisthiophene) were polymerized (Example 11), in the same manner as in Example 1. The molar ratio between monomers in Examples 9 to 11 was 1:1. FIG. 12 is the results of confirming the optical characteristics of Examples 9 to 11. In FIG. 12, 1DIDBuP/1ProD-PC_254(12h)_Acetone is the result after cleaning the polymer film of Example 9 with acetone, 1DIDBuP/1Fluorene_254(12h)_Acetone is the result after cleaning the polymer film of Example 10 with acetone, and 1DIDBuP/1CyPBTh_254(12h)_Acetone is the result after cleaning the polymer film of Example 11 with acetone. In FIG. 12, 1DIDBuP/1ProD-PC_254(12h)_H2SO4 is the result of chemically doping the polymer film of Example 9 through $H_2SO_4$ treatment, 1DIDBuP/1Fluorene_254(12h)_H2SO4 is the result of chemically doping the polymer film of Example 10 through H2SO4 treatment, and 1DIDBuP/1CyPBTh_254(12h)_H2SO4 is the result of chemically doping the polymer film of Example 11 through H2SO4 treatment.

In addition, the conductivity of the polymer film in Example 9 was a level of approximately 160 to 180 S/cm, and the conductivity of the polymer films in Examples 10 and 11 was a level of 400 to 500 S/cm.

Examples 12 and 13

Compound 9 of Synthesis Example 6 and EDOT (3,4-ethylenedioxythiophene) were polymerized (Example 12), and Compound 9 of Synthesis Example 6 and Compound 9a of Synthesis Example 6 were polymerized, in the same manner as in Example 1. Upon polymerization, the molar ratio between monomers was 1:1 and the polymerization time was 6 hours. FIG. 13 is the results showing the optical characteristics of the polymer films formed in the above manner. In FIG. 13, 1DIDBuP_1EDOT_HP254(6h)_H2SO4(50%) is the result that the monomer composition as in Example 5 is polymerized for 6 hours and then chemically doped through $H_2SO_4$ treatment, 1DIEDOT-EG_1EDOT_HP254(6h)_H2SO4 (50%) is the result of chemically doping the polymer film of Example 12 through $H_2SO_4$ treatment, and 1DIEDOT-EG_1EDOT-EG_HP254(6h)_H2SO4(50%) is the result of chemically doping the polymer film of Example 13 through $H_2SO_4$ treatment. The conductivity of the polymer film in Example 12 was a level of approximately 2250 S/cm, and the conductivity of the polymer film in Example 13 was a level of approximately 750 S/cm.

Examples 14 to 16

Compound 9 of Synthesis Example 6 and EDOT (3,4-ethylenedioxythiophene) were polymerized in the same manner as in Example 12 with different molar ratios between monomers. FIG. 14 is a view showing the optical characteristics of the polymer films according to the above results. In FIG. 14, 2DIEDOT-EG_1EDOT_HP254(6h)_H2SO4 is the result of doping the polymer film (Example 14) obtained by polymerizing Compound 9 and EDOT in a molar ratio of 2:1 (Compound 9:EDOT) through H2SO4 treatment, 1DIEDOT-EG_1EDOT_HP254(6h)_H2SO4 is the result of doping the polymer film of Example 12 through H2SO4 treatment, 1DIEDOT-EG_2EDOT_HP254(6h)_H2SO4 is the result of doping the polymer film (Example 15) obtained by polymerizing Compound 9 and EDOT in a molar ratio of 1:2 (Compound 9:EDOT) through H2SO4 treatment, and 1DIEDOT-EG_4EDOT_HP254(6h)_H2SO4 is the result of doping the polymer film (Example 16) obtained by polymerizing Compound 9 and EDOT in a molar ratio of 1:4 (Compound 9:EDOT) through H2SO4 treatment. The conductivity of the polymer film in Example 14 was a level of about 423 S/cm, and in the case of Examples 15 and 16, the conductivity was a level of 200 to 300 S/cm.

What is claimed is:

1. A method for preparing a polymer comprising:
forming a monomer mixture comprising a first monomer containing a compound of Formula 1 below and a second monomer containing at least one selected from the group consisting of a compound of Formula 2 below and a condensed cyclic compound;
irradiating the monomer mixture with light, and polymerizing it;

wherein the monomer mixture satisfies the following conditions 1 and 2:

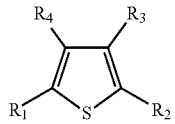

[Formula 1]

wherein, $R_1$ and $R_2$ are each independently hydrogen or a halogen atom, and $R_3$ and $R_4$ are each independently hydrogen or a flowable functional group, or are linked to each other to form an alkylenedioxy group substituted with the flowable functional group, where the flowable functional group is selected from the group consisting of an alkyl group having 3 or more carbon atoms, an alkoxy group having 3 or more carbon atoms, an alkylcarbonyl group having 3 or more carbon atoms, an alkylcarbonyloxy having 3 or more carbon atoms and a functional group of Formula 3 below, provided that at least one of $R_3$ and $R_4$ is the flowable functional group or they are linked to each other to form the alkylenedioxy group substituted with the flowable functional group;

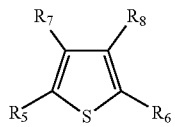

[Formula 2]

wherein, $R_5$ and $R_6$ are each independently hydrogen or a halogen atom, and $R_7$ and $R_8$ are each independently hydrogen, a hydroxy group, a carboxyl group, an amino group, an azide group, an alkyl group, a hydroxyalkyl group, a carboxylalkyl group, an arylalkyloxycarbonyl group, an arylalkyloxycarbonylalkyl group, an alkylsilyloxycarbonyl group or an alkylsilyloxycarbonylalkyl group, or are linked to each other to form a substituted or unsubstituted alkylenedioxy group, ether bond-containing group or ester bond-containing group;

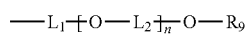

[Formula 3]

wherein, $L_1$ is a single bond or an alkylene group, $L_2$ is an alkylene group, $R_9$ is an alkyl group, and n is a number in a range of 1 to 10;

Condition 1: the compound of Formula 1 and the compound of Formula 2 do not have the same structure;

Condition 2: when the second monomer contains the compound of Formula 2, the ratio (Halo/(Halo+H)) of the molar number (Halo) of all halogen atoms and the molar number (H) of hydrogen atoms, which are included in $R_1$ and $R_2$ of Formula 1 and $R_5$ and $R_6$ of Formula 2, is in a range of 0.001 to 99, and when the second monomer does not contain the compound of Formula 2, both $R_1$ and $R_2$ of Formula 1 are halogen atoms.

2. The method for preparing a polymer according to claim 1, wherein the polymerization of the monomer mixture is performed by solid phase polymerization.

3. The method for preparing a polymer according to claim 1, wherein the flowable functional group of Formula 1 is selected from the group consisting of an alkyl group having 3 or more carbon atoms, an alkoxy group having 3 or more carbon atoms and a functional group of Formula 3.

4. The method for preparing a polymer according to claim 1, wherein $R_7$ and $R_8$ of Formula 2 are each independently hydrogen, a hydroxy group, a carboxyl group, an amino group, an azide group, a methyl group, an ethyl group, a hydroxymethyl group, a hydroxyethyl group, a carboxymethyl group or a carboxyethyl group, or are linked to each other to form an alkylenedioxy group unsubstituted or substituted with a hydroxy group, a carboxyl group, an amino group, an azide group, a methyl group, an ethyl group, a hydroxymethyl group, a hydroxyethyl group, a carboxymethyl group, an ester bond-containing group, an ether bond-containing group or a carboxylethyl group.

5. The method for preparing a polymer according to claim 1, further satisfying the following condition 2-1:
Condition 2-1: when the second monomer contains the compound of Formula 2, $R_1$ and $R_2$ of Formula 1 are halogen atoms and $R_5$ and $R_6$ of Formula 2 are hydrogen atoms, or $R_1$ and $R_2$ are hydrogen atoms and $R_5$ and $R_6$ are halogen atoms.

6. The method for preparing a polymer according to claim 4, further satisfying the following condition 3:
Condition 3: when the second monomer contains the compound of Formula 2, the molar ratio of the flowable functional group to the total molar number of $R_3$, $R_4$, $R_7$ and $R_8$ is in a range of 1 mol % to 100 mol %.

7. The method for preparing a polymer according to claim 1, wherein the wavelength of the irradiated light is in a range of 100 to 400 nm.

8. The method for preparing a polymer according to claim 1, wherein the light irradiation proceeds at a temperature of 30° C. to 100° C.

9. A method for preparing a conductive polymer film comprising:
forming a coating layer comprising a monomer mixture including a first monomer containing a compound of Formula 1 below; and a second monomer containing at least one selected from the group consisting of a compound of Formula 2 below and a condensed cyclic compound;
irradiating the coating layer with light, and polymerizing it;
wherein the monomer mixture satisfies the following conditions 1 and 2:

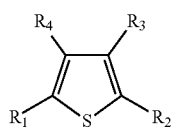

[Formula 1]

wherein, $R_1$ and $R_2$ are each independently hydrogen or a halogen atom, and $R_3$ and $R_4$ are each independently hydrogen or a flowable functional group, or are linked to each other to form an alkylenedioxy group substituted with the flowable functional group, where the flowable functional group is selected from the group consisting of an alkyl group having 3 or more carbon atoms, an alkoxy group having 3 or more carbon atoms, an alkylcarbonyl group having 3 or more carbon atoms, an alkylcarbonyloxy having 3 or more carbon atoms and a functional group of Formula 3 below (provided that at least one of $R_3$ and $R_4$ is the flowable functional group or they are linked to each other to form the alkylenedioxy group):

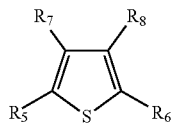
[Formula 2]

wherein, $R_5$ and $R_6$ are each independently hydrogen or a halogen atom, and $R_7$ and $R_8$ are each independently hydrogen, a hydroxy group, a carboxyl group, an amino group, an azide group, an alkyl group, a hydroxyalkyl group, a carboxylalkyl group, an arylalkyloxycarbonyl group, an arylalkyloxycarbonylalkyl group, an alkylsilyloxycarbonyl group or an alkylsilyloxycarbonylalkyl group, or are linked to each other to form a substituted or unsubstituted alkylenedioxy group, ether bond-containing group or ester bond-containing group:

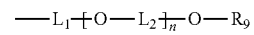
[Formula 3]

wherein, $L_1$ is a single bond or an alkylene group, $L_2$ is an alkylene group, and $R_9$ is an alkyl group:
Condition 1: the compound of Formula 1 and the compound of Formula 2 do not have the same structure:
Condition 2: when the second monomer contains the compound of Formula 2, the ratio (Halo/(Halo+H)) of the molar number (Halo) of all halogen atoms and the molar number (H) of hydrogen atoms, which are included in $R_1$ and $R_2$ of Formula 1 and $R_5$ and $R_6$ of Formula 2, is in a range of 0.001 to 99, and when the second monomer does not contain the compound of Formula 2, both $R_1$ and $R_2$ of Formula 1 are halogen atoms.

10. The method for preparing a conductive polymer film according to claim 8, wherein the coating layer is formed by a method comprising steps of coating a coating liquid including the first monomer; the second monomer and a solvent; and removing the solvent after the coating.

11. The method for preparing a conductive polymer film according to claim 10, wherein the coating liquid is pattern-coated.

12. A polymer comprising a polymerized unit of Formula 6 below, a polymerized unit of a condensed cyclic compound, together with a polymerized unit of Formula 5, wherein the following condition 4 is satisfied:

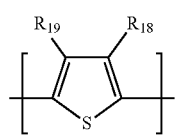
[Formula 5]

wherein, $R_{18}$ and $R_{19}$ are each independently hydrogen or a flowable functional group, or are linked to each other to form an alkylenedioxy group substituted with the flowable functional group, where the flowable functional group is selected from the group consisting of an alkyl group having 3 or more carbon atoms, an alkoxy group having 3 or more carbon atoms, an alkylcarbonyl group having 3 or more carbon atoms, an alkylcarbonyloxy having 3 or more carbon atoms and a functional group of Formula 3 below (provided that at least one of $R_{18}$ and $R_{19}$ is the flowable functional group, or they are linked to each other to form the alkylenedioxy group):

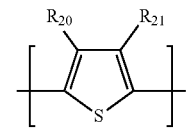
[Formula 6]

wherein, $R_{20}$ and $R_{21}$ are each independently hydrogen, a hydroxy group, a carboxyl group, an amino group, an azide group, an alkyl group, a hydroxyalkyl group, a carboxylalkyl group, an arylalkyloxycarbonyl group, an arylalkyloxycarbonylalkyl group, an alkylsilyloxycarbonyl group or an alkylsilyloxycarbonylalkyl group, or are linked to each other to form a substituted or unsubstituted alkylenedioxy group, ether bond-containing group or ester bond-containing group:

[Formula 3]

wherein, $L_1$ is a single bond or an alkylene group, $L_2$ is an alkylene group, $R_9$ is an alkyl group, and n is a number in a range of 1 to 10:
Condition 4: the polymerized unit of Formula 5 and the polymerized unit of Formula 6 do not have the same structure.

13. The polymer according to claim 12, wherein $R_{20}$ and $R_{21}$ of Formula 6 are each independently hydrogen, a hydroxy group, a carboxyl group, an amino group, an azide group, a methyl group, an ethyl group, a hydroxymethyl group, a hydroxyethyl group, a carboxymethyl group or a carboxyethyl group, or are linked to each other to form an alkylenedioxy group unsubstituted or substituted with a hydroxy group, a carboxyl group, an amino group, an azide group, a methyl group, an ethyl group, a hydroxymethyl group, a hydroxyethyl group, a carboxymethyl group, an alkyleneoxide group, an ether bond-containing group, an ester bond-containing group or a carboxylethyl group.

14. The polymer according to claim 12, further satisfying the following condition 5:
Condition 5: in the case of including the polymerized unit of Formula 6, the molar ratio of the flowable functional group to the total molar number of $R_{18}$ to $R_{21}$ is in a range of 1 mol % to 100 mol %.

15. A conductive polymer film comprising the polymer of claim 12.

16. The conductive polymer film according to claim 15, wherein the conductivity is 100 S/cm or more.

17. The method for preparing a polymer according to claim 1, wherein when the second monomer comprises a compound of Formula 2, at least one of $R_1$, $R_2$, $R_5$ and $R_6$ comprises a halogen atom.

18. The method for preparing a polymer according to claim 17, wherein when the second monomer comprises a compound of Formula 2, R1 and R2 of Formula 1 are halogen atoms and R5 and R6 of Formula 2 are hydrogen atoms, or R1 and R2 are hydrogen atoms and R5 and R6 are halogen atoms.

19. The method for preparing a polymer according to claim 17, wherein when the second monomer comprises the condensed cyclic compound, both R1 and R2 are halogen atoms.

* * * * *